Figure 1:
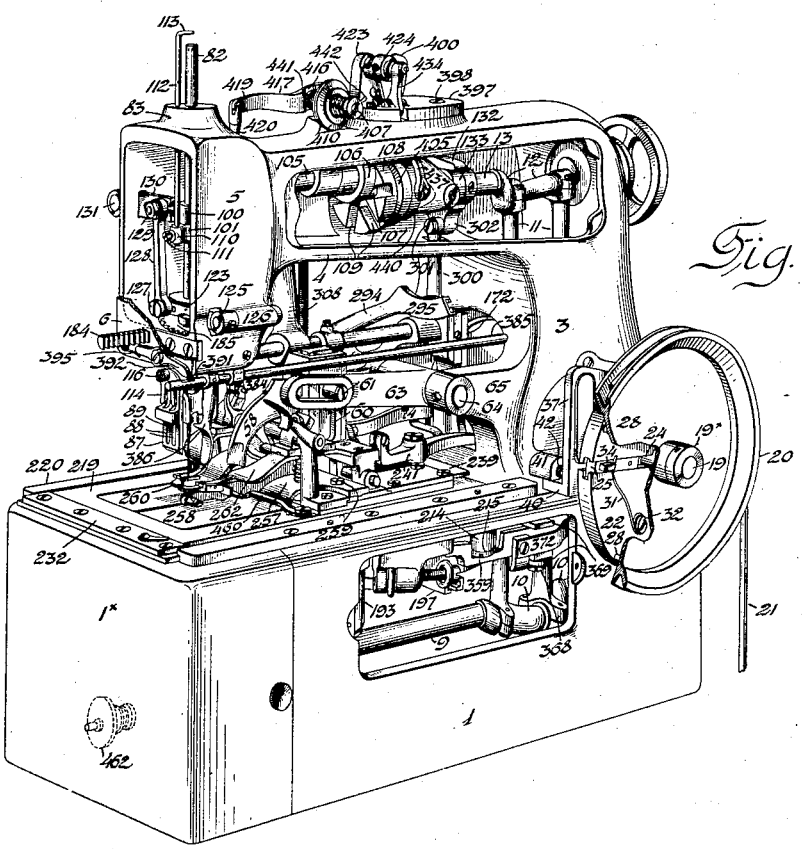

E. B. ALLEN.
BUTTONHOLE STITCHING MACHINE.
APPLICATION FILED DEC. 28, 1909.

1,024,490.

Patented Apr. 30, 1912.

6 SHEETS—SHEET 1.

WITNESSES:

INVENTOR
Edward B. Allen
BY Henry J. Miller
ATTORNEY

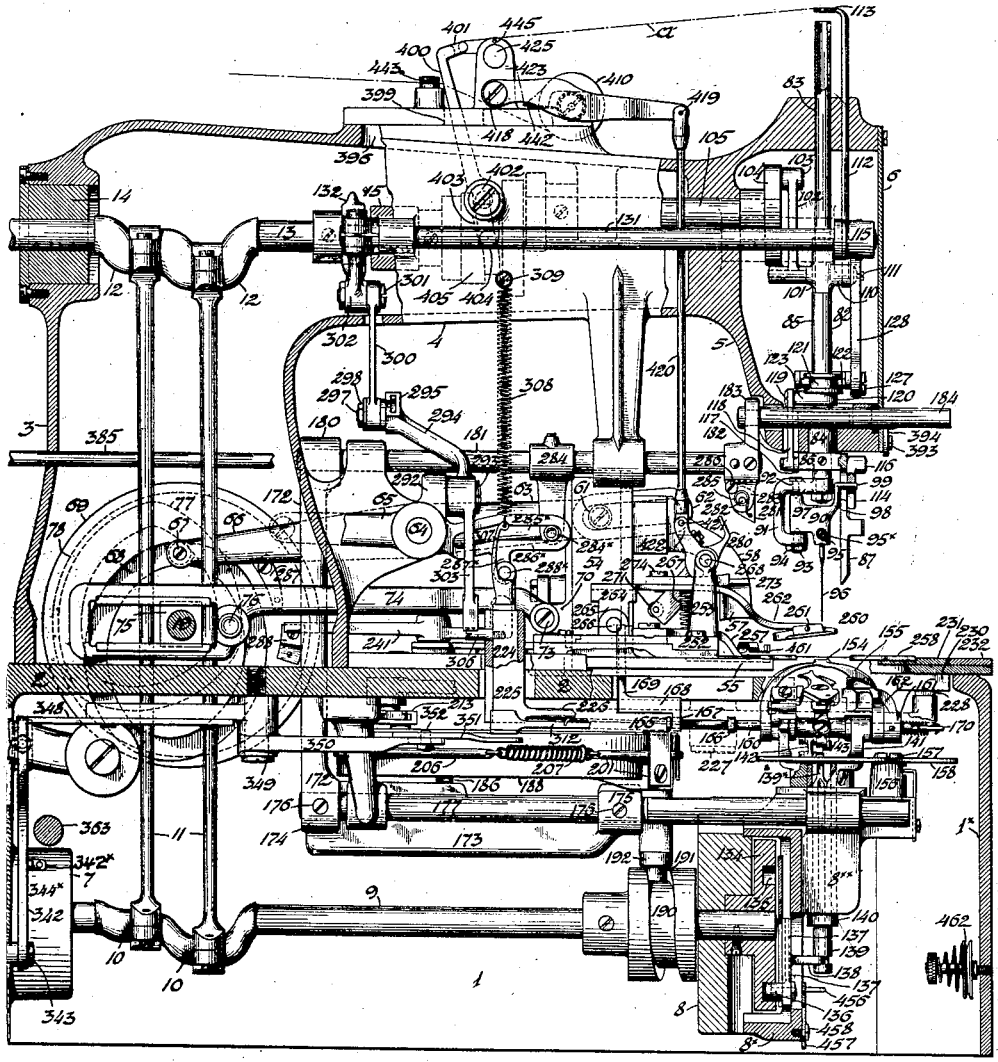

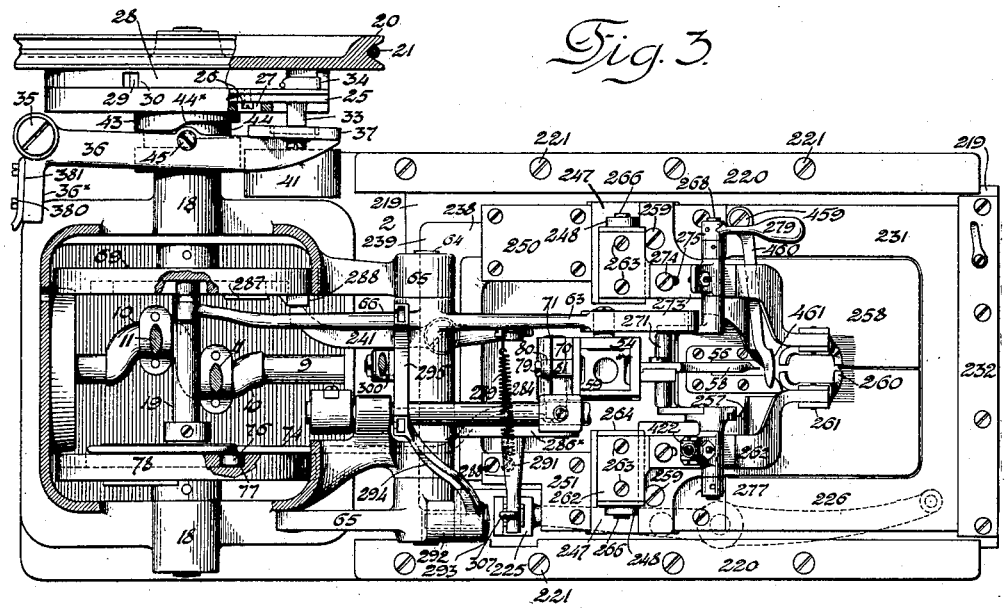
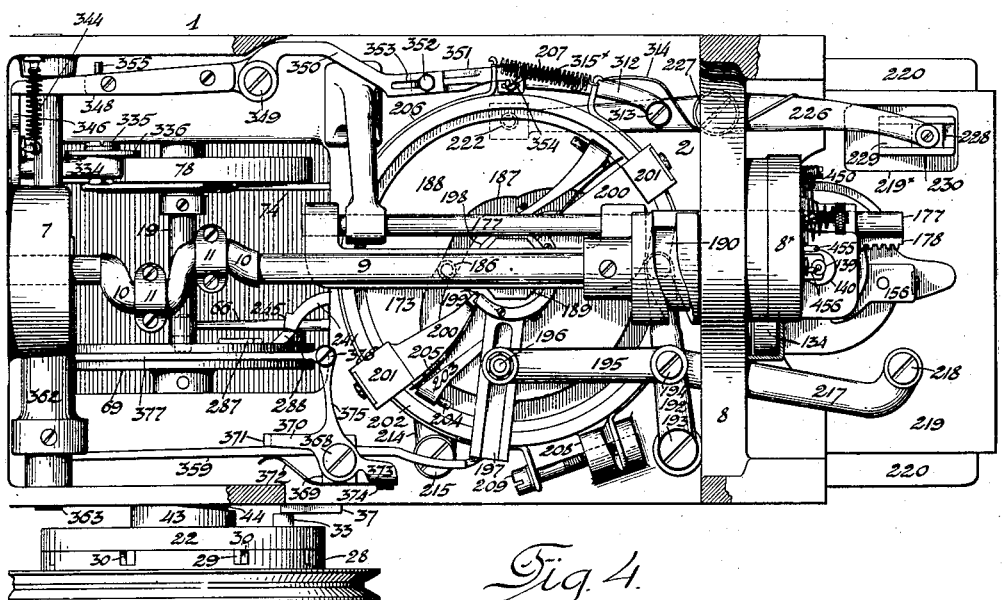

E. B. ALLEN.
BUTTONHOLE STITCHING MACHINE.
APPLICATION FILED DEC. 28, 1909.
1,024,490.
Patented Apr. 30, 1912.
6 SHEETS—SHEET 4.
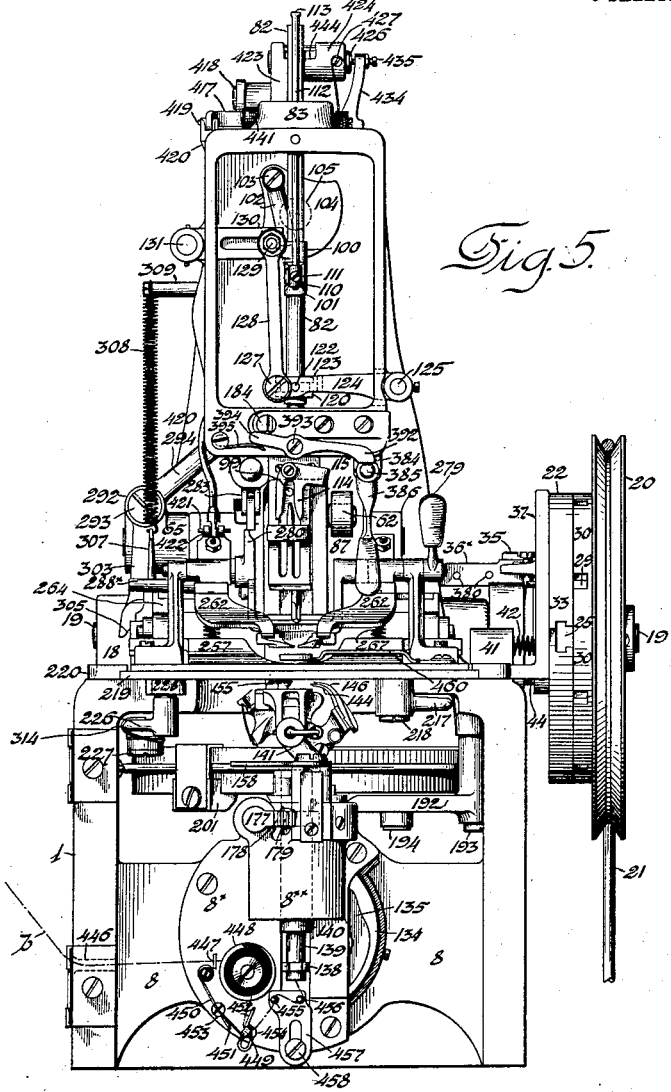
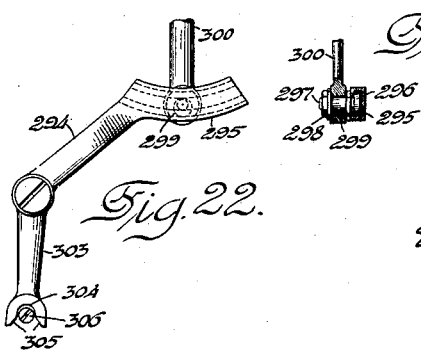
WITNESSES:
INVENTOR
Edward B. Allen
BY
Henry J. Miller
ATTORNEY

E. B. ALLEN.
BUTTONHOLE STITCHING MACHINE.
APPLICATION FILED DEC. 28, 1909.

1,024,490.

Patented Apr. 30, 1912.
6 SHEETS—SHEET 5.

WITNESSES:

INVENTOR
Edward B. Allen

BY
Henry J Miller
ATTORNEY

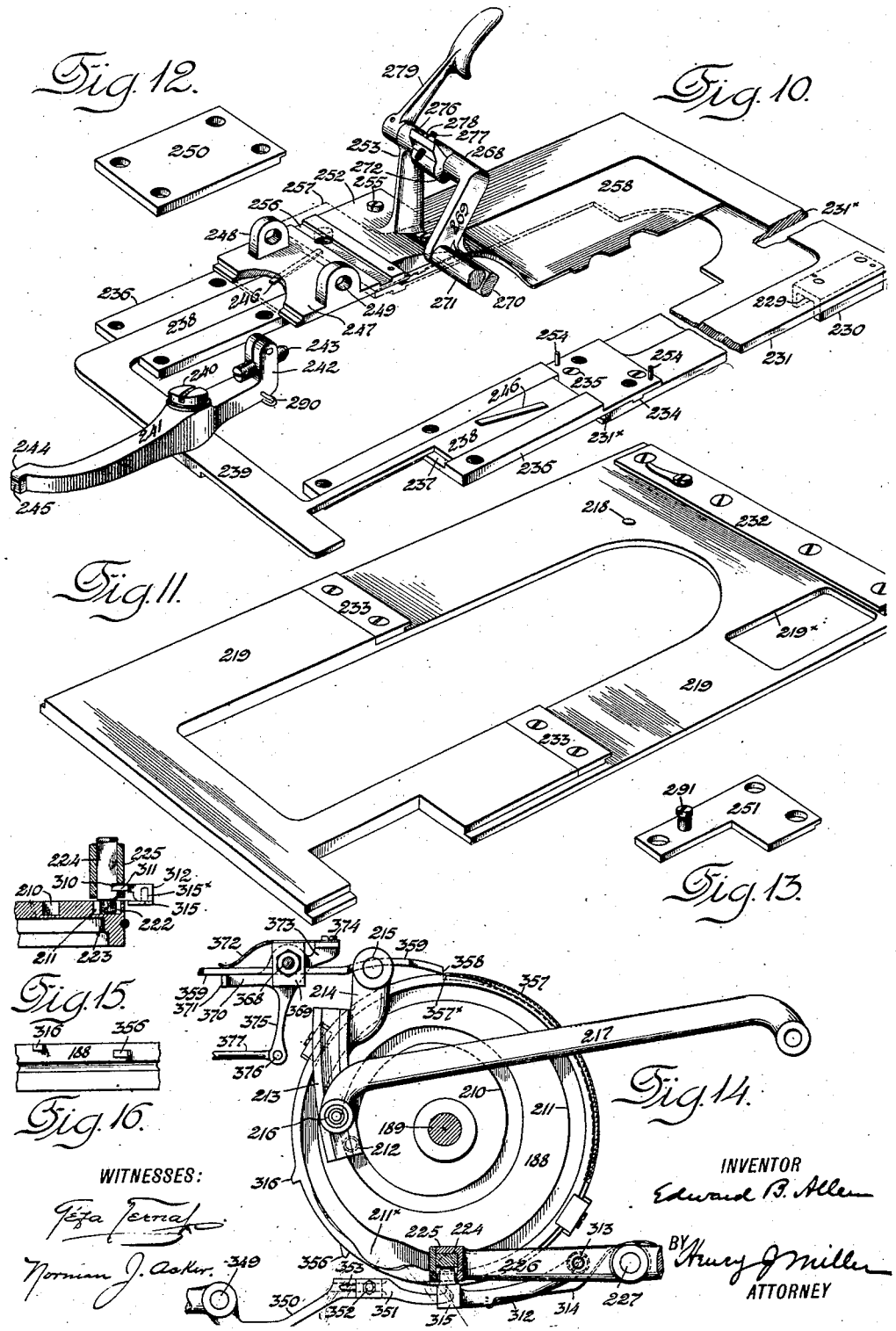

UNITED STATES PATENT OFFICE.

EDWARD B. ALLEN, OF BRIDGEPORT, CONNECTICUT, ASSIGNOR TO THE SINGER MANUFACTURING COMPANY, A CORPORATION OF NEW JERSEY.

BUTTONHOLE-STITCHING MACHINE.

1,024,490. Specification of Letters Patent. Patented Apr. 30, 1912.

Application filed December 28, 1909. Serial No. 535,340.

*To all whom it may concern:*

Be it known that I, EDWARD B. ALLEN, a citizen of the United States, residing at Bridgeport, in the county of Fairfield and State of Connecticut, have invented certain new and useful Improvements in Buttonhole-Stitching Machines, of which the following is a specification, reference being had therein to the accompanying drawings.

This invention relates to an improvement in buttonhole cutting and stitching machines, and more particularly in that class of machines for producing eyed- or eyelet-end buttonholes and requiring a relative turning movement between the stitch-forming mechanism and the work-clamp in producing the radiating stitches around the eye of the buttonhole.

The invention has for its principal objects to provide a buttonhole machine, adapted for producing eyelet-end buttonholes with bars or cross-stays across the smaller ends, which shall be capable of rapidly performing its work, adapted to be quickly set in motion and stopped with a minimum amount of jar and straining of the rapidly moving parts, and of such a character that a single machine is adapted to be adjusted for producing buttonholes in either cloth or leather.

In its preferred form, in which the machine is provided with stitching mechanism performing semi-rotations respectively during the stitching of the eye of a buttonhole and subsequently to the stitching operation, the invention includes means for varying the number and length of barring stitches independently of the side stitches, or for wholly preventing the barring operation, the clamp being laterally jogged to increase the length of the side stitches for the barring operation; means independent of the bar-producing means for adjusting the length of the buttonhole and the spacing of the stitches along the sides and around the eye of the same; means for tripping the stop-motion into action to arrest the operation of the stitch-forming mechanism independently of the clamp-jogging means and for accelerating the operation of the feeding mechanism to bring the parts to initial position after a buttonhole has been stitched; means for closing the work-holder upon the work by the advance of the cutter to cutting position to form the slit and for opening the same by the return semi-rotation of the stitch-forming mechanism to initial position after the stitching operation is completed; and means for insuring against the starting of the cutting operation while the stitching operation is proceeding, and for preventing the starting of the stitching mechanism while the cutting device is in operation.

The invention also includes certain other features to be hereinafter described and set forth in the appended claims.

Figures 20, 21:
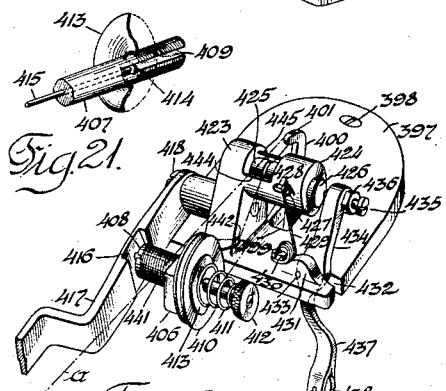
Figure 17:
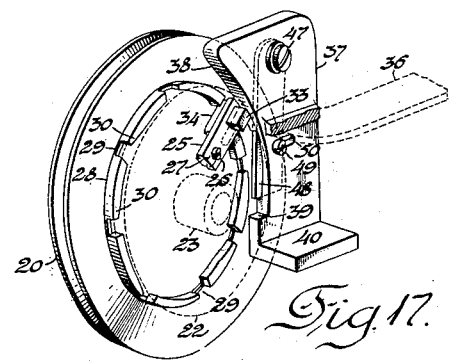
Figures 18, 19:
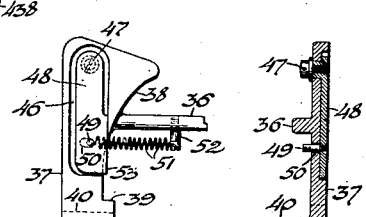
Figure 6:
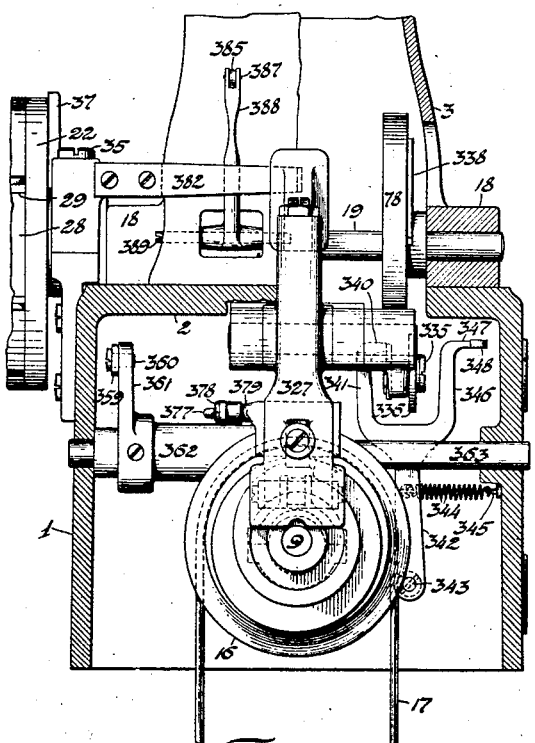
Figure 7:
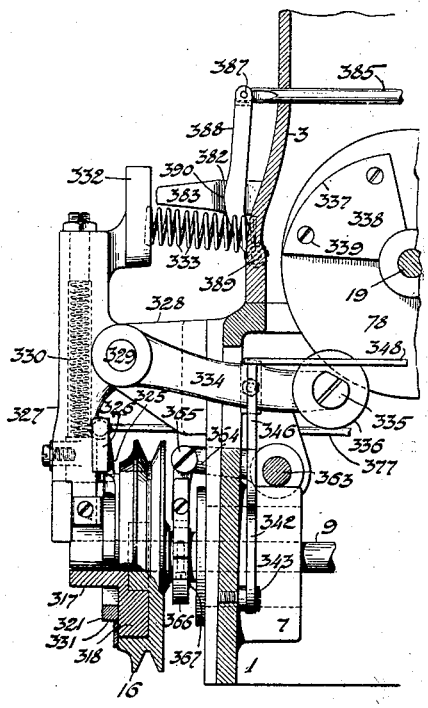
Figure 9:
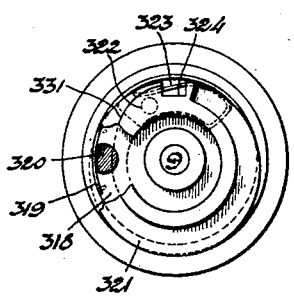

In the accompanying drawings, Figure 1 is a perspective view of the entire machine with the side covers of the bracket-arm and base and the face-plate of the head of the bracket-arm removed to expose certain operative parts of the mechanism. Fig. 2 is a rear side view of the machine with the frame in section, and Fig. 2$^a$ a plan of the looper mechanism and its support. Fig. 3 is a top plan view of the machine with the hollow standard of the bracket-arm in section and the parts supported by the lateral member of the bracket-arm removed, and Fig. 4 is a bottom plan view of the machine; the extreme rearward end of the frame and the adjacent driving parts being omitted in both views. Fig. 5 is a front end view of the machine with the hinged front end of the base and the face-plate of the bracket-arm removed. Fig. 6 is a rear end view of the lower part of the machine with the bed in section. Fig. 7 a partial sectional side elevation, and Fig. 8 a sectional plan of the same. Fig. 9 is a detail view of the upper clamp supporting plate longitudinal shaft. Fig. 10 is a perspective view of the upper clamp supporting plate and certain of the parts which it carries, and Fig. 11 a similar view of the lower clamp-plate. Figs. 12 and 13 are detail views of the cap-plates for the spreader slide-frame. Fig. 14 is a plan of the feed-wheel, its actuating means and the members of the clamp-controlling devices which it actuates. Fig. 15 is a detail sectional view of a portion of the feed-wheel and one of said members of the clamp-controlling means, and Fig. 16 a side elevation of a portion of the feed-wheel showing the tripping studs for the stop-motion and barring mechanisms. Fig. 17 is a detail perspective view of the cutter-shaft clutch device; and Figs. 18 and 19 are respectively, a side view and transverse section of the cam-lever of such clutch device. Fig. 20 is a perspective view of the needle-thread tension, take-up and nipping devices, and Fig. 21 a detail sectional view of a portion of the tension device. Fig. 22 is a side elevation of the clamp-jogging lever and a portion of the link by which it is connected to the actuating member, and Fig. 23 a detail sectional view of the eccentric-stud connection of said link to the clamp-jogging lever. Fig. 24 is a perspective view representing a detail of the cutter-actuating mechanism.

The frame of the machine is constructed with a hollow rectangular base 1 with a suitably apertured top forming a bed-plate 2 from the rear end of which rises the hollow standard 3 of the bracket-arm with forwardly extending member 4 terminating in the hollow head 5 forming a cavity for the needle-actuating parts closed by the face-plate 6.

Mounted in suitable bearing members 7 and 8 longitudinally of the base 1 is the rotary lower shaft 9, which may be called the main or driving shaft of the machine, and which is provided with quartering cranks 10 connected by means of pitman 11 with similar cranks 12 of the upper or needle-driving shaft 13 journaled in the bushing 14 and fixed bearing member 15 of the bracket-arm. The main-shaft 9 is provided upon its rearward end with a grooved belt-wheel 16 adapted to be connected therewith by a clutch device to be later described, this wheel communicating to the main-shaft power derived from the encircling belt 17 from the source of power.

Journaled in transverse bearings 18 at the base of the standard 3 of the bracket-arm is the transverse cutter-shaft 19 provided upon its front end with a loose grooved belt-wheel 20 encircled by the belt 21 by which it is connected with the source of power independently of the belt-wheel 16 and driven at a much slower speed. Fixed upon the cutter-shaft adjacent the belt-wheel 20 is the clutch-disk 22 provided with the rearwardly extending hub 23, and formed with a radial T-shaped slot 24 adapted to receive the similarly shaped slide-block 25 having on its back and front faces respectively the lug 33 and tooth 34 and whose radial motion upon the clutch-disk 22 is limited by means of the engagement of the stop-screw 26 with the opposite ends of a slot 27 formed in the clutch-disk to receive the same. The rear face of the belt-wheel 20 is provided with an annular rib 28 formed with notches 29 at intervals around its circumference to afford clutch-teeth 30 which are slightly tapered in the direction of rotation, as represented in Fig. 17; and the slide-block 25 is normally pressed outward by a spring 31 secured upon the disk by a screw 32 and engaging the tooth 34 which is adapted to enter the notches 29 intermediate the annular series of clutch-teeth 30. The loose belt-wheel 20 is therefore operatively connected with the fixed clutch-disk 22 excepting when the slide-block 25 is forcibly retracted in opposition to its spring 31. The belt-wheel 20 is held in position upon the shaft 19 by means of the fixed collar 19ˣ.

Fulcrumed upon the fixed stud-screw 35 upon the base 1 is the laterally swinging clutch-controlling lever 36 having a head 37 with a cam-shaped forward edge 38 curved slightly eccentrically to the axis of rotation of the clutch-disk 22 and terminating in the stop-shoulder 39. The head 37 has at its lower end a rearwardly extending flange 40 fitted within a slideway afforded by the top of the bed-plate 2 and the bottom of a notched lug 41 having a foot secured upon the bed-plate and formed with a socket between the bottom of which and the lower portion of the head 37 is interposed the spring 42 for normally pressing the cam-plate afforded by the head 37 toward the face of the cam-disk 22. Fixed upon the hub 23 of the cam-disk 22 is a cam-cylinder 43 having a groove 44 entered by a depending stud 45 carried by the clutch-controlling lever 36, the cam-groove having an abrupt jog 44ˣ between the two extreme parallel operative portions at the starting position as represented in Fig. 3, and inclined connecting portion upon the opposite side as represented partially in Fig. 4. The cam-plate 37 is formed in its front face with a recess 46 in which is pivoted by means of the screw-stud 47 the latch-plate 48 provided with a stop-screw 49 passing through a transverse slot 50 in the plate 37 and connected by means of a spring 51 to a screw-pin 52 upon the lever 36 so as to normally retain the latch-plate 48 with its forward or operative edge 53 projecting slightly beyond the cam-edge 38 of the plate 37 and spaced above the stop-shoulder 39 slightly more than the thickness of the clutch-tooth 34.

In the normal stopping position of the parts thus described, the slide-block 25 is at its extreme inner position with the clutch-tooth 34 withdrawn from engagement with the clutch-teeth 30 of the pulley-wheel 20 and with the lug 33 in contact with the stop-shoulder 39 of the cam-plate 37. The shifting of the clutch-controlling lever 36, by means presently to be described, so as to move the cam-plate 37 backwardly from the adjacent face of the pulley-wheel 20, carries the stud 45 from the outer to the inner portion of the jog 44ˣ of the cam-groove 44 and disengages the stop-shoulder 39 from the lug 33 of the slide-block 25, thus permitting the latter to move outwardly under the action of its spring 31 to introduce the clutch-tooth 34 into engagement with the inclined inner face of one of the teeth 30 along which it rides into the intermediate notch 29 to couple the clutch-disk with the driving pulley-wheel 20. As the clutch-disk 22 nears the completion of a rotation the clutch-controlling lever 36 is returned into initial position by the action of both the spring 42 and the auxiliary action of the cam 43, thus bringing the cam-edge 38 into the path of movement of the stud 33 by means of which the slide-block 25 is thrust inwardly to disengage its clutch-tooth 34 from the pulley-wheel clutch-tooth 30 so as to uncouple the driven from the driving member. As the lug 33 arrives at initial position, it engages the stop-shoulder 39 of the cam-plate 37, and it is prevented from rebounding by the adjacent edge of the latch-plate 48 which snaps into operative position as the lug 33 passes over it. By the means thus described the cutter-shaft 19 is insured only a single turning movement for each clutch-releasing actuation of the controlling lever 36.

The traveling buttonhole cutting device of the present improvement is similar in general construction to that disclosed in my United States Patent No. 864,144, of August 27, 1907, although differing therefrom in its actuating means. As in the former construction, this device comprises a hollow post or standard 54 having a base or foot-plate 55 mounted to slide longitudinally in a suitable guideway provided therefor in the bed-plate 2, the foot-plate having a throat or die 56 forming the lower cutting member and adapted to be entered by a knife or cutter 57 formed on an arm 58 rigid with the cutter-bar 59 which reciprocates vertically in the post or standard 54. The post 54 has in its forward face a clearance slot 60 through which passes the lateral roller-stud 61 projecting from the cutter-bar 59. The outer end of the stud 61 is embraced by the longitudinally slotted forward end 62 of the arm 63 of a rock-lever, fulcrumed by means of the transverse pin 64 upon the bearing arms 65 extending from the standard 3 of the bracket-arm, and having a rearwardly extending arm 66 provided with a lateral roller-stud 67 entering the cam-groove 68 in the rearward face of the cam-disk 69 fixed upon the cutter-shaft 19.

Extending from the rear side of the post 54 is a split lug 70 formed with a transverse socket embracing the body of a pivotal pin 71 having an eccentric stud 72 upon which is confined by means of the screw 73 the apertured forward end of a link-bar 74 whose opposite end is formed with a longitudinal slot affording a slideway for the opposite edges of a guide-block 75 loosely mounted upon the cutter-shaft 19, by which the link-bar 74 is supported. The link-bar is provided with a roller-stud 76 extending rearwardly therefrom into a cam-slot 77 formed in the forward face of a cam-wheel 78 fixed upon the cutter-shaft 19. The split lug 70 is clamped upon the body of the pivotal pin 71 by means of a screw 79 passing through the ear 80 of one member of the lug and tapped into a projection 81 in the other member, and by loosening the screw 79, the pin may be turned to change the position of the stud 72 to afford a slight longitudinal adjustment of the operative or cutting position of the cutter in relation to the stitch-forming mechanism. The rotation of the cutter-shaft causes the advance bodily of the cutter-frame comprising the post 54 and its foot-plate 55, by the action of the cam 78 upon the link-bar 74, and the knife or cutter 57 constituting the movable member of the cutting device is depressed by means of the cam 69 and rock-lever 63 66; the cutter 57 being raised and the cutter-frame returned to initial position by reciprocal actions of their respective actuating devices.

As herein represented the general constructions of the needle-reciprocating and jogging devices and the looper mechanism are similar to those of my Patent No. 945,148, of January 4, 1910, although differing therefrom in certain details. The needle-bar 82 is journaled to rotate in an upper bearing 83 in the head of the bracket-arm and is journaled to reciprocate in the rotary bearing sleeve or bushing 84 mounted in the lower portion of the head 5 of the bracket-arm, being connected to rotate with the bearing sleeve by means of the spline 85. The bearing sleeve 84 carries beneath the head 5 a block 86 to which is secured the depending guide-plate 87 having the parallel slots or runways 88 connected at the upper ends and separated by the tongue 89 with wedge-shaped upper end. To the threaded lower end of the needle-bar is secured by means of the clamp-nut 90 the clamp-supporting yoke 91 carrying the upper conical-pointed bearing screw 92 having its head seated firmly within a countersunk recess in the top of the yoke and an adjustable conical-pointed bearing screw 93 tapped into the lower member of the yoke and secured adjustably therein by means of the lock-nut 94. The laterally movable needle-clamp 95 is provided with the usual socket in which the shank of the needle 96 is clamped by means of the screw $95^x$, and has a rearwardly extending boss 97 with bearing sockets entered by the points of the screws 92 and 93, while at the forward side the clamp is provided with an upwardly extending arm 98 having a lateral pin 99 adapted to enter and move vertically in either of the parallel slots 88 in the guide-plate 87. The upper portion of the needle-bar is reduced to form a shoulder and has confined thereon between said shoulder and the fixed collar 100, the loose collar 101 having a lateral stud embraced by the lower end of the pitman 102 embracing at its upper end the stud-pin 103 upon the crank-plate 104 fixed upon the forward end of the shaft 105 which is journaled in suitable bearings in the bracket-arm with its axis slightly above that of the needle-actuating shaft and has fixed upon its rear end the disk 106 carrying upon its rearward face a circularly arranged series of lateral studs 107. The forward end of the needle-actuating rotary shaft 13 has fixed thereon the disk 108 with a plurality of intersecting diametrical grooves 109 entered by the studs 107, and forming therewith a trammel device which, through the described connections, imparts two complete vertical reciprocations to the needle-bar for each rotation of the needle-actuating shaft and the main-shaft. The loose collar 101 is provided with a forwardly projecting lug 110 formed with a vertical socket in which is secured by means of the fastening screw 111 the lower end of a reciprocating rod 112 slidingly fitted within a suitable bearing in the head 5 of the bracket-arm parallel with the needle-bar and having a rearwardly extending guide-finger 113 at its upper end having a thread aperture concentric with but of smaller diameter than the bore of the hollow needle-bar, whereby the thread is led from the source of supply into the needle-bar so as to avoid friction with the top of the latter and to be uninfluenced in any way by the turning of the needle-bar in the stitching of the eye of the buttonhole.

The outer end of the pin 99 is embraced by the divergent members of the depending forked arm 114 of the rocking yoke 115 pivotally mounted by means of screws 116 upon the block 86 and provided with a lateral arm 117 pivotally connected with the lower end of the link 118 whose upper end is connected by means of the pivotal pin 119 with a boss upon the loose sleeve 120 slidingly mounted upon and adapted to rotate with the needle-bar 82 and provided with an annular groove 121 which is entered by the diametrically disposed pins 122 carried by the spaced members of the forked end 123 of a lever 124 pivotally mounted upon the fixed fulcrum-pin 125 journaled in a bearing boss 126 upon the head 5 of the bracket-arm. One of the members of the fork 123 is connected by means of the screw-pin 127 with the lower end of a link 128 which is adjustably connected at its upper end by means of a pivotal screw 129 with the slotted segmental crank-arm 130 fixed upon the forward end of the rock-shaft 131 which is journaled in suitable bearings upon the rear side of the lateral member 4 of the bracket-arm and which carries at its rearward end a second crank-arm or rocking member 132 forked at its outer end to embrace the actuating eccentric 133 fixed upon the needle-actuating shaft 13. The cam 133 is so set upon its supporting shaft 113 that rocking movements are imparted through the rock-shaft 131 and the described connections to communicate vibratory movements to the forked arm 114 at each time that the needle-bar rises to bring the pin 99 to the upper end of its reciprocatory movement within one of the slots 88 of the guide-plate 87 where it is received into the fork to be directed in the initial portion of its succeeding descent into the guide-slot adjacent that which it has just traversed, thereby swinging the needle-clamp upon its fulcrum-screws 92 and 93 to impart the requisite jogging movements to the needle for production of overseaming stitches.

The shaft 9 has fixed upon its forward end the cam-disk 134 having a cam-groove 135 entered by a stud 136 projecting from a slide-plate 137 movable vertically in suitable ways provided therefor in the cap 8ˣ of the bearing member 8 and having a forwardly projecting forked lug 138 embracing the notched or necked lower end of a hollow vertical pin 139 slidingly fitted within the tubular stem 140 of the rotary looper-carrier supporting frame 141 and formed at its upper end with a laterally extending arm 139ˣ pivotally connected by means of a link 142 with an arm of the rocking looper-carrier 143 upon which are rigidly mounted the thread-carrying looper 144 and non-threaded looper 145, the former having overlying the same the forked spreader 146 fulcrumed upon the screw-stud 147, and the latter having the overlying forked spreader 148 fulcrumed upon the screw-stud 149. The spreaders 146 and 148 which move in a segmental path, are provided adjacent their fulcrum-studs with laterally extending portions 150 and 151, respectively, adapted to engage the rigid cam members 152 and 153 to rock the spreaders as they approach their advance positions for spreading the thread-loops carried by the respective loopers which they normally overlie under the action of suitable springs.

In the coöperation of the needle and loopers for production of overseam stitches along the sides and around the eye of the buttonhole, the needle makes a depth thrust through the material back from the edge of the slit and presents its loop which is entered by the superposed points of the non-threaded looper 145 and its spreader 148, the loop being retained by the oppositely projecting shoulders presented by the respective loop-seizing members and carried forward to extreme advance position, during which movement the spreader is shifted laterally and the loop distended for passage of the needle in its succeeding descent, the needle meanwhile rising to its highest position and moving laterally in readiness for its next descent. In the succeeding edge-thrust of the needle through the buttonhole slit, it passes through its previously distended thread loop and presents a second loop which is entered by the threaded looper 144 and its overlying spreader 146, while the non-threaded looper and its coöperating spreader are simultaneously withdrawn to shed the depth stitch loop. As the needle rises and the threaded looper continues to advance, the overlying spreader is shifted laterally to form and spread a loop of looper thread extending from the eyed point of the looper upwardly to the material through the needle-throat 154 formed in the arched member 155 pivotally mounted upon the looper-carrier supporting frame 141, the looper loop being maintained distended for passage of the needle in the subsequent depth stitch thrust for presentation of a succeeding loop for seizure by the non-threaded looper and its respective spreader, as before described.

The bearing lug 8×× for the stem or spindle 140 of the looper-carrier supporting frame is shown provided with a stud 156 upon which is mounted by means of the screw-pin 157 the cord-guide 158 adapted to be swung outward for threading, as represented in Fig. 2ª, but having its thread delivery eye 159 normally in alinement with the central aperture of the pin 139.

As in my said patent, the slide-pin 160 affords the pivotal connection between the looper-supporting frame, the looper-carrier 143 and the tilting needle-throat carrying arched member 155; and this pin has fixed upon its forward end (in the position of the parts represented in Fig. 2) a collar 161 with divergent locking arms 162 and 163, adapted to embrace between them the adjacent portion of the tilting needle-throat carrying member 155. The arm 163 is slidingly fitted to a fixed guideway 164 of the looper-carrier supporting frame, and the arm 162 has an inclined cam edge adjacent its locking shoulder to return the member 155 to initial position after it has been tilted out of normal position by engagement with the laterally beveled forward end of the cutter die plate 56 as the cutter advances for a cutting operation. The slide-pin 160 is provided upon its rearward end portion with spaced thrust-collars 165 and 166, and intermediate such collars it is embraced by the forked lug 167 of a bracket member 168 attached by its shank 169 to the cutter-bar supporting post 54. The slide-pin is further provided upon its forward end with a bent wire 170 having an eye in its lateral portion entered by one end of a spring 171 whose other end is attached to the looper-carrier support 141, by which the locking yoke 162 163 is yieldingly maintained in operative relation with the tilting throat carrying member 155. When the cutter advances to cut a buttonhole, it carries with it the forked lug 167 whose engagement with the thrust-collar 166 serves to advance the slide-pin 160 in opposition to its spring 171, as represented in Fig. 2ª, previous to the engagement of the die plate 56 with the boss surrounding the needle-throat 154 by which the latter is thrust aside to permit the cutting operation. As the cutter recedes after performing its function, the slide-pin 160 is permitted to return to initial position under the action of the spring 171, the cam-edge of the locking arm 162 engaging the member 155 moving the latter backwardly into normal or stitching position in which it is again locked as the cutter returns to retracted or inoperative position. As the cutter approaches retracted position, the return movement of the forked lug 167 therewith insures the retraction of the slide-pin 160 by engagement with the thrust-collar 165 in case the spring 171 should not have previously effected this return movement.

The turning mechanism for the stitch-forming devices comprises a reciprocatory frame constructed with the upright member 172 having a lower arm 173 provided with suitable sockets 174 and 175 in which is secured by screws 176 the lower rack-bar 177 having let into its forward end the rack 178 whose lateral teeth mesh with the teeth of a pinion 179 fixed upon the spindle 140 of the looper-supporting frame 141; the upper end of the member 172 being formed with a socket 180 in which is similarly secured the rearward end of the slide-bar 181 having fixed upon its opposite end the collar 182 having a perforated lug 183 in which is secured the necked rearward end of the rack 184 whose lateral teeth are in mesh with the teeth of the pinion 185 formed upon the upper end of the sleeve or bushing 84. The racks 178 and 184 are both provided with means for their slight lateral adjustment to compensate for wear.

To impart the necessary operative movements to the reciprocatory frame whereby the stitch-forming mechanism receives an initial semi-rotation to lay the stitches radially around the semicircular end of the eye and a final semi-rotation in the opposite direction after the completion of a stitching operation, the lateral arm 173 is provided with a roller-stud 186 which enters a cam-groove 187 formed in the lower face of the horizontally arranged feed cam-wheel 188 journaled upon a stud 189 tapped into the under side of the bed-plate 2. The cam-groove, as indicated in Fig. 4, has two concentric portions to maintain the turning frame in its extreme positions during the side stitching operations and intermediate active portions to impart to said frame the to-and-fro movements for giving to the upper and lower stitch-forming devices their turning movements in opposite directions.

Mounted upon the forward portion of the main-shaft 9 is an actuating cam 190 entered by a roller-stud 191 depending from the free end of a vibrating lever 192 mounted upon the fixed fulcrum-stud 193 and connected intermediate its ends by means of the stud-screw 194 with one end of a link 195 whose opposite end is connected by means of the adjustable stud 196 with the slotted clutch-lever 197 whose hub is fitted loosely upon the hub of the cam-wheel 198 and is provided with peripheral notches 199 forming shoulders against which rest the tapered inwardly extending arms 200 of the clutches 201 embracing the depending annular flange 202 of the cam-wheel 188. The hub of the clutch-lever 197 has fixed rigidly thereto the oppositely extending arms 203 carrying adjustable contact-screws 204 bearing against the free ends of springs 205 fixed at the opposite ends to the inner portions of the clutch arms 200, whereby the clutch members 201 are maintained yieldingly in cramping relation with the feed-wheel flange 202. The feed-wheel actuating mechanism as thus described is similar, excepting in certain details, to that shown and described in my United States Patent No. 862,125, dated August 6, 1907, and the feed-wheel has imparted to it the usual step-by-step rotary motion, the speed of which may be varied by shifting the stud 196 radially upon the clutch-lever 197. To insure against overthrow of the cam-wheel, the latter is encircled by the sectional band 206 whose members are connected upon one side by means of the spring 207 and are connected together and to the fixed stud 208 depending from the bed-plate at the opposite side by means of the adjusting screw 209 in a manner well known.

As in my Patent No. 862,125, before mentioned, the feed-wheel is provided in its upper face with the feed-actuating cam-groove 210 from which is imparted to the work-holder its longitudinal travel to space the side stitches, and a cam-groove 211 for imparting to the work-holder the requisite side shifting movements to insure the proper laying of the stitches in the inclined sides of the eye of the buttonhole between the circular end portion and the straight parallel sides of the body portion. The cam groove 210 is entered by a roller-stud 212 depending from the free end of the slotted segmental arm 213 of the swinging lever 214 fulcrumed upon the fixed stud 215, and in the slot of the arm 213 is introduced the head of the adjustable pivotal screw 216 embraced by one end of the link 217 whose opposite end portion embraces a depending stud 218 upon the bottom of the longitudinally movable main clamp-carrying slide 219 whose edges are fitted to guideways in the gibs 220 secured by fastening screws 221 along the edges of the bed-plate 2 by which the slide-plate 219 is supported. The cam-groove 211 is entered by an anti-friction roller 222 journaled upon a stud 223 depending from the bottom of a vertically movable slide-bolt 224 fitted within a transverse socket 225 at the rearward end of the side shift lever 226 which is fulcrumed upon the fixed stud 227 depending from the bed-plate and carries at its opposite end a slide-block 228 which is fitted within a longitudinal guideway 229 within a guide-block 230 depending through an aperture 219$^\times$ in the primary work-clamp slide-plate from the cross slide-plate 231. The slide-plate 231, which constitutes an auxiliary member of the work-clamp carrier, is of U-shape with the forward extremity of its forward member and the rear extremity of its side members notched at 231$^\times$ to enter transverse slideways formed between the top of the main slide-plate 219 and the gibs 232 and 233 secured thereon. The parallel side members of the slide-plate 231 have secured thereto by means of the transverse rib-and-groove connections 234 and screws 235 the guide-plates 236 formed with longitudinal guide-channels 237 in their upper faces entered by the parallel members 238 of the spreader frame whose connecting cross-member 239 carries a screw-stud 240 upon which is mounted the swinging lever 241 having in its split upturned forward end 242 the longitudinally extending adjustable contact-screw 243 and having at its rearward end the angularly arranged side and end contact faces 244 and 245. The forward portions of the side members 238 of the spreader frame have upon their upper faces the convergently inclined guide-ribs 246 which enter correspondingly inclined grooves in the bottoms of the clamp-arm bearing plates 247 provided with the parallel spaced bearing lugs 248 with alined apertures 249. The parallel transversely disposed edges of the plates 247 are notched to fit guideways formed upon the rear side between the tops of the extension plates 236 and cap-plates 250 and 251 secured thereon and serving to confine the spreader frame members 238 in their guideways; while the forward notched edges of the plates 247 enter slideways between the upper faces of the extension plates 236 and the conversely notched rearward edges of the clamp-closing shaft bearing plates 252 formed with the upwardly extending bearing posts 253 and secured upon the reduced forward end portions of the extension plates 236 by means of steady pins 254 and fastening screws 255.

The forward portions of the clamp-arm bearing plates 247 are formed with transverse grooves 256 to which are fitted depending tongues upon the end portions of the laterally and rearwardly extending arms 257 of the clamp-plates 258 let into the recessed upper face of the slide-plate 231 and constituting the lower clamp members, which are secured in position by means of screws 259. The upper clamping members which are opposed to the clamp-plates 258 consist of the clamping feet 260 pivotally mounted by means of the pins 261 upon the forward extremities of the clamp-arms 262 whose rearward ends are secured by means of screws 263 upon tilting blocks 264 having depending perforated lugs 265 pivotally connected by means of the transverse pins 266 with the ears 248 of the transversely sliding plates 247. The clamp is maintained normally opened by means of springs 267 interposed between the bottoms of the clamp-arms 262 and the tops of the plates 247.

Journaled in the bearings at the upper ends of the posts 253 is the clamp operating shaft 268 formed intermediate the outer ends with depending crank-arms 269 connected at their lower extremities by the cross member 270 and carrying adjacent the cross member the anti-friction roller 271 lying normally in the path of movement and adapted to engage the forward face of the cutter post 54 by the movement of which the shaft 268 is adapted to be rocked in closing the clamp. The shaft 268 has fixed thereon adjacent each of the bearing posts 253 the angular cam-blocks 272 adapted to bear upon the wearing plates 273 adjustably secured upon the clamp-arms by means of fastening screws 274 passing through longitudinal slots 275 therein, these wearing plates having the forward end portions slightly thickened to form inclined wearing parts, the longitudinal adjustment of which beneath the cam-block 272 serves to provide for variations in the pressure of the clamping feet 260 upon the work. The cam-blocks 272 are provided with rearwardly projecting ears 276 through which pass the stop-screws 277 provided with lock nuts 278 by means of which the clamping movements of the shaft 268 under the final impulse produced by the engagement of the eccentric portions of the cam-blocks 272 upon the wearing plates 273 is determined. The forward end of the rock-shaft 268 has fixed thereon the finger lever 279 by means of which the shaft may be operated manually for opening and closing the clamp independently of the automatic actuating mechanism.

The clamp operating rock-shaft 268 has upon its rearward end portion the backwardly bent crank-arm 280 extending in the opposite direction from the crank-arms 269, the inclined extremity of its crank-arm lying normally in the path of movement of the angular extremity of the latch-block 281 pivotally mounted by means of the pin 282 in a forked lug 283 projecting downwardly from the collar 182 fixed upon the forward end of the reciprocatory bar 181 from which the needle derives its turning movement. As represented in dotted lines in Fig. 2, the inclined upper edge of the latch-block is normally maintained in contact with the inner extremity of the fork by means of a spring 285 surrounding the pivotal pin 282 and connected at one end with the latch-block and at the other end with the screw 286 upon the lug 283.

As before indicated, the advance of the cutting device to operative position brings the post 54 into engagement with the roller 271 carried by the clamp-operating rock-shaft 268 and the latter is rocked to cause the cam-blocks 272 to act upon the clamp-arms in depressing the same to close the clamp, thereby bringing the clamp-arm 280 in position for engagement with the latch-block 281. As the bar 181 moves forward in imparting the initial turning movement to the needle, the latch-block yields as it engages the arm 280 and therefore has no effect upon the latter; but as the bar 181 performs its return movement in rotating the needle backwardly into initial position, the engagement of the forward face of the latch-block with the rearward side of the arm 280 moves the same forward and thereby turns the shaft 268 sufficiently to bring the angular portions of the cam-blocks 272 beyond the neutral point of engagement with the wearing plates 273, whereby the springs 267 are enabled to immediately lift the clamp-arms 262 to open the clamp.

According to the present improvement, the clamp-spreading frame is maintained normally in its rearward or spreading position, and the separable sections of the clamp are brought together just before the cutting operation and are separated immediately thereafter. To this end, the cam-disk 69 upon the cutter-shaft carries upon its inner or rearward face the cam-plate 287 with eccentric outer operative face adapted to engage the cam-face 245 of the spreader-lever 241 to move the spreader-frame forward to bring together the clamp sections just after the cutter commences its advance to operative position. As the cutter recedes from operative position, the point of the screw 243 is engaged by the lug 70 upon the rearward side of the cutter-frame post 54 and the spreading frame is thereby returned to initial spreading position and the material is stretched preparatory to the succeeding stitching operation. As the spreader-frame is mounted upon and travels with the clamp-supporting devices, it is necessary to provide against the succeeding engagement of the contact-screw 243 with the cutter-frame, and to this end the cam-disk 69 is provided upon its inner face with a cam-block 288 adapted to engage the side cam-face of the lever 241 under the action of the spring 289 interposed between a hook 290 carried by the forward portion of the lever 241 and a screw 291 upon the cap-plate 251 and thus serving to maintain the rearward end of the lever 241 in operative relation with its actuating cam-disk. As the cam-block 288 acts upon the lever 241 just as the cutter-shaft comes to rest after having performed a complete rotation, it will be seen that the lever 241 is maintained normally out of operative relation with the cutter-frame, and is permitted to assume operative relation therewith only during the time when the cutter mechanism is in action.

The rearward bearing arm 65 of the fulcrum-pin 64 is formed with an upwardly projecting lug 292 upon which is fulcrumed by means of the stud-screw 293 the clamp-jogging lever having an upwardly and forwardly projecting arm 294 provided with a slotted segmental offset portion 295 in the undercut slot of which is introduced the round head 296 of an adjustable shouldered pivotal bolt 297 adapted to be clamped in position by means of the clamp-nut 298 and provided with an eccentric body portion 299 which is embraced by the apertured lower end of the link 300 whose opposite end passes through an aperture in the bottom of the member 4 of the bracket-arm and embraces the screw-pin 301 carried by the depending lug 302 upon the lower fork of the rocking member 132. The clamp-jog lever has a depending arm 303 provided with a forked lower extremity having a transverse open-ended stud-socket 304 with flaring mouth to afford inwardly inclined guide-wings 305 adapted to receive a lateral coupling stud or pin 306 projecting from the rear side of the slide-bolt 224 through a longitudinal slot in the side cover-plate of the socket.

The slide-bolt 224 is provided at the top with an upwardly projecting arm 307 to which is connected the lower end of a spring 308 having its opposite end attached to a screw-stud 309 upon the member 4 of the bracket-arm, whereby the slide-bolt is normally drawn upwardly. The slide-bolt is provided in its lower end portion with a lateral notch 310 entered by a latch-piece 311 secured upon the latch-lever 312 fulcrumed by means of the screw 313 upon the side-shift lever 226, the latch-piece being normally pressed into operative relation with the slide-bolt by means of a spring 314 encircling the side-shift lever fulcrum 227 and connected at one end with said lever and at the opposite end with the latch-lever 312, whereby the slide-bolt is normally retained in its initial lower position with the roller-stud 222 within the cam-groove 211 of the feed cam-wheel so as to enable the side-shift lever to perform its normal side-shifting action upon the work-holder. The latch-lever 312 is provided upon its lower face with a tripping plate 315 adapted to engage a tripping stud 316 upon the periphery of the cam-wheel 188 whereby, at the end of a side stitching operation, the latch-plate 311 is caused to be forcibly withdrawn from the notch 310 of the slide-bolt to enable the latter to be raised by the action of its spring 308 so as to disengage the roller-stud 222 from the feed cam-groove and simultaneously enter the lateral stud 306 into the socket 304 of the clamp jog-lever whereby the side-shift lever receives a lateral jogging movement which is communicated to the work-holder in opposition to the lateral movements of the needle to increase the length of the overseam stitches in forming the bar at the end of the buttonhole slit. As the step-by-step rotary movements are communicated to the feed cam-wheel by friction-clutch mechanism, the timing of the action of the tripping stud 316 upon the latch-lever 226 may not be such as to bring the socket 304 precisely into register with the stud 306 as the latter rises, and consequently the flaring side wings 305 of the socket are provided to receive the stud 306 at such times and direct it into the socket 304 as soon as the lateral vibration of the jog-lever arm 303 will permit. To provide such adjustment as may be desired for the timing of the release of the slide-bolt to initiate the barring operation, the tripping plate 315, which is secured in place on the lever 312 by means of a screw 315$^x$, may be made adjustable toward and from the fulcrum of the latter, or the tripping stud 316 may in practice be formed upon a circularly adjustable plate, like the tripping stud 195 of my Patent No. 751,239.

The slide-bar 181 has fixed thereon intermediate its ends the collar 284 having a depending rigid arm carrying the roller-stud 284$^x$ entering the cam-slot 285$^x$ in the forwardly extending cam-lever 286$^x$ fulcrumed upon the transverse fulcrum-pin 64 and provided with a depending lug 287$^x$ with the lateral thrust-pin 288$^x$ adapted to engage a shoulder afforded by the top of the slide-bolt 224 adjacent its upwardly projecting arm 307. The roller-stud 284$^x$ has a horizontal path of movement in alinement with the axis of the fulcrum pin 64, and in the normal lower position of the cam-lever 286$^x$, the straight forward part of the cam-slot 285$^x$ is parallel with the slide-bar 181 and in radial relation to its own axis of vibratory movement, while the rearward or inner part of the cam-groove is downwardly inclined; so that the movement of the roller-stud 284$^x$ toward and from the fulcrum-pin 64 operates, as it traverses the inclined rearward portion of the cam-slot to respectively raise and lower the cam-lever with its thrust-pin 288ˣ.

In the starting positions of the various parts of the machine, the several elements of the barring mechanism, as just described, are disposed as shown in Figs. 2 and 15 with the slide-bolt locked in its lower position and the roller-stud 222 within the feed-wheel cam-groove 211. The parts of its mechanism remain in the same positions until the stitching of one side and a portion of the eye has been completed, when the motion of the slide-bar 181 to turn the needle mechanism in stitching the semi-circular end portion of the eye brings the roller-stud 284ˣ into the inclined portion of the cam-groove 285ˣ to lift the cam-lever 286ˣ. The parts remain in this position, with the cam-lever 286ˣ raised and the thrust-pin 288ˣ lifted clear of the slide-bolt 224 until the completion of the second side-stitching operation when the tripping of the latch-lever 312 causes the release of the slide-bolt, the consequent withdrawal of the stud 222 from the cam-groove 211, and the entrance of the lateral stud 306 into the socket 304 of the clamp-jogging lever arm 303 for the barring operation. In this condition of the barring mechanism the stitching mechanism is subsequently stopped by means presently to be described and the stitch-forming mechanism thereafter turned back to initial position by a reciprocal movement of the slide-bar 181, which depresses the cam-lever 286ˣ and thus causes the engagement of the thrust-pin 288ˣ with the top of the slide-bolt 224 (now in its raised position) to force the latter downwardly and thereby disengage the pin 306 from the socket 304 of the clamp-jogging lever and bring the roller-stud 222 again into the cam-groove 211 in which position it is maintained by the engagement of the latch-plate 311 with the notch 310 of the slide-bolt. It will thus be seen that the thrust-pin 288ˣ acts in conjunction with the latch-lever 312 in maintaining the connection between the feed-wheel and side-shift lever during the first side-stitching operation, the thrust-pin 288ˣ is retracted during the eye-stitching operation, and the latch-lever 312 is retracted to establish barring conditions at the end of the side-stitching operation; and that side-stitching condition is reëstablished independently of the action of the barring mechanism and subsequently to the completion of a stitching operation while the stitch-forming mechanism is being turned through a final semi-rotation to bring it to initial side-stitching position.

As disclosed more fully in my Patent No. 864,144, before mentioned, adjacent the loose driving pulley 16 is secured upon the main-shaft 9 the hub 317 of a clutch-wheel or disk 318 recessed at one portion of its periphery for the reception of a clutch-plate 319 interposed between said wheel and the wall of a chamber for the same in the loose pulley, said wheel also having a segmental recess upon the inner side of said plate for the reception of a cam projection 320 upon a clutch-ring 321 which has a pivotal connection with said clutch-wheel by means of said projection to enable the clutch-ring to swing slightly relative to the clutch-wheel on said projection as a center or pivot, thus causing the cammed or flattened outer portion of said projection to clamp the clutch-plate tightly against the wall of the chamber in the pulley 16 when the latter is to be connected to the driving shaft 9. The clutch-ring 321 is provided with a pin 322 extending within a recess in the clutch-wheel 318 containing a spring 323 bearing against said pin so as to force the parts into clutching position, as shown in Fig. 9. The clutching-ring 321 is provided at its periphery with a notch 324 for the reception of a lug or projection 325 on a vertically movable block 326 carried by the stop-motion lever 327 pivotally mounted in a bracket 328 on the base or frame of the machine by means of the rock-shaft 329 upon which said lever is rigidly mounted, a spring 330 mounted in a recess in said lever serving to press said block yieldingly downward, and said clutch-ring 321 being provided with an eccentric or cam projection 331 to engage said lug or projection 325 to lift the same for braking the final rotation of the shaft 9 and causing said projection to fall into the notch 324 so as to swing the clutch-ring slightly in opposition to the action of the spring 323 for release of the clutch-plate 319 when the stop-motion lever has been tripped and the machine is to be stopped. The stop-lever 327 is provided at its upper end with a forwardly extending thrust-plate 332 between a recess in the forward face of which and the standard 3 of the bracket-arm is interposed a spring 333 tending to throw the lower operative portion of the lever forwardly to bring the lug or projection 325 of the block 326 into operative relation with the clutch-ring 321 to stop the machine.

Fixed upon one end of the pivotal rock-shaft 329 of the stop-lever 327 is a forwardly extending arm 334 carrying at its extremity a stud-screw 335 upon which is mounted the anti-friction roller 336 disposed adjacent the cam-wheel 78 and adapted to be engaged by the eccentric outer operative edge 337 of a cam-plate 338 secured by screws 339 upon the rearward face of said cam-wheel. As the cutter-shaft 19 completes a rotation in performing a cutting operation, the lower portion of the cam edge 337 of the cam-plate 338 engages the roller 336 of the stop-lever shifting arm 334 and depresses the same, whereby the lug 325 is disengaged from the notch 324 of the cam-ring 321 to permit the latter to assume under the action of the spring 323 eccentric relation with the main-shaft 9 to cause the stud 320 to nip the clutch-plate 319 in coupling the clutch-wheel 318 to the loose pulley wheel 316 and thereby initiate the action of the stitch-forming and feeding mechanisms. As the arm 334 is depressed, it is locked from immediate return to initial position by the advance above its upper edge of the lateral finger 340 of one member 341 of a yoke formed at the upper end of a locking lever 342 which is pivotally mounted upon the fixed fulcrum-pin 343 and is drawn toward the rearward side of the machine by means of a spring 344 interposed between a pin 342˟ on said lever and an eye 345 upon the inner face of the base 1. The other member 346 of the yoke of the locking lever is also provided with a laterally projecting finger 347 the rearward edge of which lies in the path of movement of the extremity of the arm 348 of a tripping lever mounted upon the fixed fulcrum-pin 349 and having a bent arm 350 to which is adjustably secured the nose-piece 351 by means of a clamp-screw 352 of the latter entering a longitudinal slot 353 in the former, whereby the tooth 354 at the operative end of the nose-piece may be adjusted toward and from the fulcrum 349 of the lever. The arm 348 is provided with a lateral stop-pin 355 whose extremity is adapted to engage the side wall of the base 1 in one extreme position of the lever, under the action of the spring 344 through the yoked locking lever 342, while its tilting action to throw the locking lever backwardly to disengage the locking finger 340 from the shift-lever 334, is imparted by a tripping stud 356 formed upon the periphery of the feed cam-wheel 188 near the tripping stud 316.

It is evident that, in lieu of the adjustment of the nose-piece 351 above described, the tripping stud 356 may be adjustably mounted upon the feed cam-wheel similarly to the tripping stud 195 of my Patent No. 751,239.

By reference to the drawings, it will be observed that the parts 315 and 354 are arranged at substantially the same point in the circumference of the feed-wheel while the tripping points 316 and 356 are spaced apart so as to act successively upon their respective following members with an interval during which the stitch-forming mechanism continues its action in performing a barring operation prior to the tripping of the stop-motion device to arrest the action of the stitch-forming mechanism. It is evident that by varying the relative tripping positions of the barring and stop-motion mechanisms the number of barring stitches produced prior to the stopping of the stitching mechanism may be correspondingly varied independently of the number of the side or covering stitches previously produced around the edges of the buttonhole slit. It will be further observed that, by reason of the mutual independence of the several means whereby the throw of the link 217 for transmitting the longitudinal feeding movements to the work-clamp, the amplitude of vibratory movements of the clutch-lever 197 for imparting the step-by-step rotary movements to the feed-wheel 188 may be varied, and whereby the timing of the action of the stop-motion may be modified, the number and spacing of the side and covering stitches and the number of the barring stitches may be determined independently, and the machine is thus adapted for such adjustment as to enable it to operate upon either cloth or leather in all cases wherein the cutting mechanism is to operate in advance of the stitch-forming mechanism, while certain of these features are equally applicable to a machine adapted to perform the buttonhole slit cutting operation subsequent to stitching, as will be evident. It is obvious that by so adjusting the machine that the tripping of the stop-motion will occur before the barring mechanism comes into action the previously stitched buttonhole will be left in unbarred condition, and may be subsequently barred, if desired, by employment of a special machine for the purpose. In the accompanying drawings, the range of adjustment of the nose-piece 351 is represented as comparatively small, but in practice the degree of adjustment is substantially equal to the distance between the tripping studs 316 and 356 which may also be made adjustable as before explained, if desired.

When the stop-motion device is actuated to stop the machine at the completion of the stitch-forming operation, the stitch-forming mechanism remains in the position in which it stitched the second side of the buttonhole, a semi-rotation from initial position, and under normal conditions the barring mechanism is still operatively connected with the side-shift lever 226. In order to return the parts to initial position for repeating the stitching operation, the movement of the feed-wheel 188, which has been stopped after only a partial rotation, must be continued to complete a full rotation. To this end, the feed-wheel is provided with a segmental series of ratchet-teeth 357 adapted for successive engagement by the wedge-shaped extremity 358 of a reciprocatory pawl bar 359 whose rearward end is pivotally connected by means of the screw-pin 360 with the upwardly extending crank-arm 361 fixed upon an oscillating sleeve 362 mounted upon the cross-shaft 363 journaled in suitable bearings of the base 1, said sleeve being provided with a lateral crank-arm 364 to which is pivotally connected by means of the screw 365 the upper end of an eccentric strap 366 embracing an eccentric 367 formed upon the hub of the loose pulley-wheel 16 and adapted to rotate continuously therewith independently of the rotation of the main-shaft 9. Mounted upon a fixed fulcrum-screw 368 carried by a bracket 369 attached to the base 1 is a plural-armed rocker having one arm 370 formed with a depending finger 371 normally resting against the inner face of the pawl bar 359 against which it is yieldingly pressed by means of the spring 372 fastened to a second arm 373 of the rocker by means of a screw 374. The rocker is provided with a third inwardly extending arm 375 connected by means of the pivotal screw 376 to the forward end of a connecting rod 377 whose rearward end is pivotally connected by means of the pin 378 with a stud 379 carried by the stop-lever 327. When the stop-lever is shifted to start the machine, the rod 377 is drawn backward to tilt the rocker upon its pivotal stud 368, whereby the constantly reciprocating pawl-bar 359 is retracted to disengage it from the periphery of the feed-wheel 188; but when the stop-motion is tripped and the lever 327 is rocked into operative position to stop the rotation of the main-shaft and the connected parts, the rod 377 moves forward to bring the operative end of the pawl bar 359 into operative relation with the ratchet-teeth 357 of the feed-wheel in which relation it is maintained by the yielding action of the spring 372. The pawl bar continues its action upon the rack until it reaches the wearing portion 357×, as represented in Fig. 14, when it continues its reciprocatory movements idly until the actuation of the stop-lever for a succeeding stitching operation, at which time the feed cam-wheel is picked up by the primary actuating clutch mechanism before described and the pawl-bar is thrown out of contact relation with the periphery of the feed-wheel. It will be observed that according to the present improvement the primary feed-wheel actuating mechanism is in constant operative relation with the cam and that immediately after the barring action the auxiliary or supplemental actuating mechanism including the pawl bar 359 comes additionally into operative relation with the feed-cam without disturbing the primary actuating mechanism.

Figure 8:
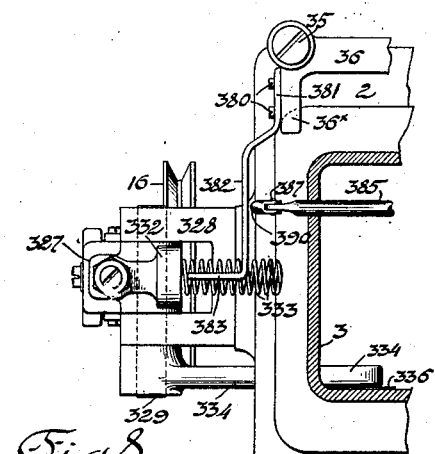

The clutch-controlling lever 36 is provided adjacent its fulcrum 35 with an inwardly extending arm 36× to which is secured by screws 380 the foot 381 of a rigid arm 382 extending back of the standard 3 of the bracket-arm and having a lateral stop-finger 383 whose extremity is presented to the forward face of the thrust-plate 332 for which it serves as a stop at certain times. The parts 332 and 383 are represented in Figs. 6, 7 and 8 in the relation which they assume when the clutch-controlling lever 36 has been retracted to start the button-hole cutting operation, as represented in Fig. 3.

Journaled in a bearing lug 384 depending from the head 5 of the bracket-arm, and in bearings in the standard 3, is a horizontally arranged reciprocatory starting rod 385 carrying near its forward end the depending finger-piece 386 and pivotally connected at its rearward end by means of the pin 387 with the upper end of an upright shift-lever 388 fulcrumed upon a transverse pin 389 and having a convex cam portion 390 adapted to engage the front face of the stop-arm 382 carried by the clutch-controlling lever 36. In the top of its forward portion the starting rod 385 is formed with a notch 391 adapted to be entered by the lower operative edge of the forward arm 392 of the detaining lever fulcrumed upon the shouldered screw 393 affording the lower fastening device for the face-plate and having a rearwardly extending arm 394 whose upper edge is normally pressed against the lower side of the rack-bar 184 under the impulse of a spring 395. The forward portion of the rack-bar is cut away upon its under side to permit the arm 392 to drop into the notch 391 of the starting rod excepting when the rack-bar 184 is in its extreme forward and initial position, where the arm 394 rests upon the rounded bottom of the bar by which the locking arm 392 is maintained lifted above the notch 391. The starting rod is thus disengaged from the locking arm 392 when the turning mechanism for the stitch-forming devices is in initial position, but is thereafter locked from operative movement after the stitch-forming mechanism turns in the stitching of a buttonhole until the feed-cam completes a full rotation in the latter portion of which the engagement of the roller-stud 186 of the reciprocatory turning frame with the cam-groove 187 serves to restore the stitch-forming mechanism to initial position by means of which the lever 392 394 is rocked upon its pivotal screw 393 to unlock the starting rod for a succeeding operation. When the lever 36 is in normal stopping position, as represented in Figs. 1 and 5, preparatory to the performance of a cycle of operation, the pressure of the operator upon the finger-piece 386 causes the backward movement of the rod 385 and consequent engagement of the shift-lever 388 with the arm 382 of the clutch-controlling lever, by means of which the latter is thrown backwardly in opposition to the spring 42, the stud 45 being shifted axially from the forward straight portion of the cam-groove 44 to the rearward portion, as indicated in dotted lines in Fig. 3. This movement disengages the lug 33 of the slide-block 25 from the cam-plate 37 of the lever 36 and permits the coupling of the loose and fixed wheels 20 and 22 to perform a rotation of the cutter-shaft for the clamp-operating and button-hole cutting movements before described. As the cutter-shaft nears the completion of its rotary movement the cam-plate 338 engages the roller 336 of the stop-lever shifting arm 334 whereby the shaft 329 is rocked and the stop-lever 327 tilted to permit the operative engagement of the clutch members of the driving shaft, the rotation of the latter causing the described operation of the stitch-forming and feeding mechanisms to produce the side or covering stitches along the sides and rounded end of the buttonhole slit, and the throwing in of the jogging mechanism and the jogging of the clamp in opposition to the lateral needle movements to produce barring stitches of increased length at the narrow end of the buttonhole. As the stop-motion is tripped to arrest the action of the stitch-forming mechanism and other parts operatively connected with the main-shaft, the rocker connected with the stop-lever, by which the position of the pawl-bar 359 is controlled, is turned upon its supporting fulcrum and the pawl-bar brought into operative relation with the ratchet-teeth 357 presented thereto by the rotation of the feed-wheel under the action of its primary actuating devices, and the step-by-step movement of the feed-wheel is thus continued at an increased speed and by positively engaging means to bring it to initial position where its motion is arrested by presentation of the final wearing portion 357ˣ of the ratchet member to the point 358 of the pawl-bar 359. The increased speed of movement of the feed-wheel to initial position is caused by the comparatively long traverse of the pawl-bar 359 and correspondingly wide spacing of the ratchet-teeth 357 in relation to the normal movement of the feed-wheel under the action of its actuating clutch mechanism during the edge-stitching which includes the application of the covering stitches to the sides and eyelet end of the buttonhole slit. As before explained, the cam-plate 37 of the lever 36 begins to resume operative position after the cutter-shaft 19 has performed a partial rotation, under the action of the spring 42 and the groove 44 of the cam-cylinder, and as the cam-shaft approaches the end of its rotation the lug 33 rides down the inclined cam-edge 38 of the plate 37 and over the latch-plate 48 into engagement with the shoulder 39 and the lower edge of the latch-plate, being simultaneously thrust inward to disengage the tooth 34 from its respective notch 29 between the teeth 30 of the loose pulley-wheel 20. As previously stated, when the clutch-controlling lever 36 is shifted to start the cutter-shaft 19, the stop-finger 383 is shifted nearly into contact with the forward face of the thrust-plate 332 carried by the stop-lever, whereby the latter is prevented from being tilted while the cutting devices are in action, but as the lever 36 resumes initial position, the stop-finger 383 is advanced to permit the actuation of the stop-lever 327. When, however, the finger 383 is in the position last described, with the thrust-plate 332 in substantially the relation represented in Fig. 7, but with the stop-lever shifted into position to cause the main-shaft 9 to rotate, the clutch of the cutter-shaft is prevented from being actuated, as any attempted movement of the controlling lever 36 would bring the stop-finger 383 rigidly connected therewith into engagement with the thrust-plate 332 of the starting lever which latter is locked in operative position by means of the spring-pressed locking lever 342. It will thus be seen that effective means are provided in the present machine for preventing the starting of the main-shaft 9 while the cutter-shaft is rotating, or preventing the throwing of the cutter-shaft 19 into operation while the main-shaft is in motion.

The top of the lateral member 4 of the bracket-arm is shown formed with an aperture 396 which is normally closed by a cap 397 secured in position by means of screws 389. The cap 397 has an opening 399 through which passes the upper arm of the take-up lever 400 formed at its upper extremity with a thread-eye 401 and fulcrumed within the bracket-arm upon a fixed screw-stud 402. The take-up lever has a depending arm 403 carrying a stud 404 which enters a groove in the take-up cam 405 fixed upon the needle-actuating shaft 13 from which the take-up lever derives two operative vibratory movements for each rotation of said shaft. The cap 397 is provided with a forwardly projecting lug 406 in which is secured the tubular tension stud 407 provided at one end with the head 408 and in the opposite externally threaded end with the longitudinal slit 409. Surrounding the slitted end portion of the stud 407 is the rotary tension-wheel 410 with peripheral thread-groove which is forced against the adjacent face of the lug 406, or the usual interposed friction washers, by means of the spring 411 interposed between the adjustable nut 412 applied to the outer end of the stud 407 and the washer 413 formed with an aperture embracing the stud having a cross-member 414 passing through the slit 409. In the axial aperture of the stud 407 is introduced the releasing pin 415 bearing at one end upon the cross-member 414 of the washer 413 and bearing at the opposite end upon the inclined cam-face 416 of a lever 417 fulcrumed at one end by means of the screw 418 upon the cap 397, and connected by means of a pin 419 with the forked upper end of a rod 420 whose lower end is pivoted by means of the pin 421 between upwardly extending ears 422 upon one of the clamp-closing cam-blocks. When the rock-shaft 268 is turned to close the clamp, the rod 420 is drawn downward and imparts a corresponding movement of the tension-controlling lever 417, which serves to free the pin 415 to enable the spring 411 to perform its normal function in applying a drag to the rotation of the tension-wheel; but when the rock-shaft 268 is automatically moved in the opposite direction to open the clamp, the lever 417 is lifted and the pin 415 is forced forwardly to shift the washer 413 in opposition to the spring 411 for relieving the drag upon the tension-wheel.

Intermediate the tension-wheel 410 and the take-up lever 400 is interposed a thread-nipping device. An upwardly extending lug 423 upon the cap 397 carries a tubular bearing boss 424 in one end of which is introduced the fixed nipper member 425, while in its forward end portion is inserted in alinement therewith the plug 426 constituting the movable nipping member, which is provided with a lateral screw-pin 427 passing through a slot 428 in the side of the boss 424 and engaged by the hooked end of a nipper opening spring 429 secured at its opposite end by means of the screw 430 upon the cap 397. The top of the cap 397 is formed with a lug 431 and an adjacent transverse slot 432 in which latter is pivoted by means of the pin 433 the nipper-actuating lever of which one arm 434 carries the adjustable contact-screw 435 with jam-nut 436, and the other depending arm 437 is forked at its lower end to receive the anti-friction roller 438 journaled upon the pin 439 and bearing upon the actuating cam 440 upon the rotary shaft 13. The cam 440 is so shaped as to impart two actuations of the lever 434 437 for each rotation of the shaft 13 so as to produce a nipping and releasing action, timed in a wellknown manner, for each reciprocation of the needle. Surrounding the outer end of the stud 407, and interposed between its head 408 and the bearing lug 406 is the thread check-spring 441 having the usual eyed spring-arm 442 through which the thread passes as it is led from the tension-wheel to the eye of the take-up lever preparatory to its passage through the eye of the reciprocatory thread-guiding member 112 into the hollow needle-bar.

In threading the upper thread mechanism, the needle thread $a$ is led from the source of supply through a thread-guide 443 upon the cap 397, thence to the tension-wheel 410 around which it is given a turn and a half, and from which it is led over the guide-shoulder 444 and between the fixed and movable members of the thread-nipping device to the eye 401 of the take-up lever, from which it is led forwardly over the guide-pin 445 and through the eye in the guide-finger 113 of the reciprocatory rod 112 into the needle-bar from whose lower end it emerges and is passed through the eye of the needle.

The looper thread $b$, in its passage to the eyed looper, is taken from the thread supply and led through an aperture 446 in the rear side of the base, thence through a guide-eye 447 upon the cap $8^x$ of the forward bearing member 8, between tension disks 448 of a tension device also mounted upon the cap $8^x$, thence through the eye 449 at the free end of a check-spring 450 working between the outturned ends of stop-pins 451 and 452 adjustably secured upon the cap $8^x$ by means of screws 453 and 454, respectively, and from the eye 449 is led successively through suitable guide-eyes in the pins 455 and 456 upon the adjustable plate 457 secured upon the cap $8^x$ by the screw 458 into the flared lower end of the hollow vertically reciprocating pin 139, from the upper end of which it is led to the eye of the looper 144.

The operation of the upper and lower stitch-forming devices in handling the respective threads of the overseam is substantially the same as is described in my Patent No. 945,148, before mentioned, and in the prior patents referred to therein, and a detailed description thereof is not therefore here necessary to an understanding of the present improvement.

To insure the proper guidance of the edge of the fabric to which the buttonholes are to be applied, the cross slide-plate 231 has preferably secured at the front side by means of the fastening screw 459 one end of a supporting arm 460 provided at its free end adjacent the clamping feet 260 with an upturned guide-lip 461 against which the edge of the material rests in shifting the same between buttonhole stitching and cutting operations.

From the foregoing description, it will be observed that the present machine is of that type in which an overseam stitch involving two punctures of the material within and back of the slit is provided for each rotation of the main-shaft and the needle-actuating shaft rotating in unison therewith, but it differs from such machines in that, instead of employing two straight needles, it has only a single laterally jogging needle to which is imparted two reciprocations for each rotation of the main-shaft, thus making it practicable to employ the class of looper mechanism herein shown and described for producing a two-thread overseam stitch. In order to produce a covering overseam which is laid symmetrically in relation to the edge of the slit, the feed-actuating cam-groove 190 is given a form suitable for producing two actuations of the feed-wheel clutch mechanism for each rotation of said cam, so that a feeding motion of the work-holder is produced after each reciprocation of the needle. By the means referred to, the running of the machine at even a moderate speed serves to produce overseam stitches at a comparatively rapid rate by reason of the rapid reciprocation of the needle with a comparatively slow movement of the actuating devices for the other moving parts. Thus the driving of the heavier parts at slow speed and the employment of the speed accelerating trammel device for imparting the multiple reciprocations to the needle imposes a comparatively light load upon the stop-motion mechanism by which the shock of stopping the moving parts is reduced to a minimum for a given output of the machine; while the load imposed upon the driving member in overcoming the inertia of the moving parts in starting the mechanism is correspondingly diminished by the moderate speed at which the parts are required to operate, whereby the full speed of the mechanism is promptly attained after starting and the efficiency of the machine is correspondingly increased. Another advantage gained by the present improvement, especially in beginning the stitching of a buttonhole is the uniformity with which the feed of the work is effected, owing to the promptness of the actuating parts in reaching a normal speed, and hence the uniformity of action of the friction clutch mechanism by which the feed cam-wheel 188 is driven.

The hinged front section 1˟ of the base 1 is shown provided upon its inner face with the tension device 462 through which the cord is led from the source of supply to the guide-eyes of the cord-guide arm 158.

As described in my said pending application, the needle is so disposed and its jogging mechanism is so constructed and arranged that the needle is in both its edge stitch and depth stitch positions eccentric to the axis of oscillation of the needle-bar; while the feed cam-groove 210 and side-shift groove 211 of the cam-wheel 188 are so formed as to impart to the clamp the longitudinal and lateral movements represented diagrammatically in Fig. 60 of the drawings of my Patent No. 734,794, dated July 28, 1903, the travel of the clamp being wholly arrested during the semi-rotation of the stitch-forming mechanism while the semi-circular end of the buttonhole is being covered with its radial stitches. While the forms of the cam-grooves 210 and 211 are determined by the shape and character of the buttonhole to be produced, in practice the cam-groove 210 is formed with a dwell to arrest the longitudinal travel of the clamp for the barring operation and the groove 211 is suitably formed to laterally shift the clamp so that the barring stitches will be properly placed. As represented in Fig. 14, the side-shift cam-groove 211 is formed with an enlargement 211˟ at the barring position to insure the free and unobstructed entrance of the roller-stud 223 into the same after each barring operation. In the present embodiment of the improvement the cam-wheel 188 is shown as a simple disk, but it will be readily seen that the form and relation of its operative portions is immaterial so long as they are suitably shaped and arranged to perform their described functions and are connected to receive their circular operative movements in unison.

It is evident that the present improvement, in many of its features, is susceptible of wide variation in construction and arrangement of parts, and it is therefore to be understood that the present invention is not limited to the specific embodiment of its several parts herein shown and described.

Having thus set forth the nature of the invention, what I claim herein is:—

1. In a buttonhole stitching machine, the combination with overseaming stitch-forming mechanism, turning mechanism therefor, and feeding mechanism for producing relative feeding movements between the stitch-forming mechanism and the work and including means for determining the number of edge-stitches to be formed, whereby an eyelet-end buttonhole comprising a series of edge-stitches and a plurality of barring stitches at the smaller end may be produced, of controlling means, ineffective during the production of the edge-stitches, whereby the number of barring stitches may be varied independently of the number of edge-stitches.

2. In a buttonhole stitching machine, the combination with overseaming stitch-forming mechanism, means for rotating the stitch-forming mechanism for stitching the eye of the buttonhole, and mechanism for producing relative feeding movements between the stitch-forming mechanism and the work and including means for determining the number of edge-stitches to be formed, of barring mechanism, and means independent thereof, and acting independently of the controlling means for the edge-stitches, whereby the period of action of the barring mechanism, and hence the number of barring stitches, may be varied irrespective of the number of edge-stitches.

3. In a buttonhole stitching machine, the combination with overseaming stitch-forming mechanism, means for rotating the stitch-forming mechanism for stitching the eye of the buttonhole, and mechanism for producing relative feeding movements between the stitch-forming mechanism and the work, of barring mechanism including means for increasing the length of overseam stitches for the bar, and means whereby the number of barring stitches may be varied independently of the number of edge stitches.

4. In a buttonhole stitching machine, the combination with overseaming stitch-forming mechanism, means for imparting a semi-rotation thereto, and feeding mechanism for producing relative feeding movements between the stitch-forming mechanism and the work and including means for determining the number of edge-stitches to be formed, whereby an eyelet-end buttonhole comprising a series of edge-stitches and a plurality of barring stitches at the smaller end may be produced, of controlling means, ineffective during the production of the edge-stitches, whereby the number of barring stitches may be varied irrespective of the number of edge-stitches, and positively-acting means for imparting a semi-rotation to the stitch-forming mechanism to bring the same to initial position at the completion of the barring operation.

5. In a buttonhole stitching machine, the combination with overseaming stitch-forming mechanism, a work-clamp, barring mechanism comprising clamp-jogging means, mechanism for imparting relative feeding and side shifting movements between the stitch-forming mechanism and work-clamp, and means for imparting a relative semi-rotation between the stitch-forming mechanism and the work-clamp, whereby an eyelet-end buttonhole with a plurality of barring stitches at its smaller end may be produced, of controlling means whereby the number of barring stitches may be varied independently of the number of edge stitches, and means acting at the completion of the barring operation for imparting a relative semi-rotation between the stitch-forming mechanism and the work-clamp to establish the initial relation of the same.

6. In a buttonhole stitching machine, the combination with overseaming stitch-forming mechanism, a stop-motion device whereby the action of the stitch-forming mechanism may be arrested; a work-clamp, mechanism for imparting relative feeding and side shifting movements between the stitch-forming mechanism and work-clamp, barring mechanism and means for imparting a relative semi-rotation between the stitch-forming mechanism and the work-clamp, whereby an eyelet-end buttonhole with a plurality of barring stitches at its smaller end may be produced, of means acting independently of the barring mechanism whereby the number of barring stitches may be varied independently of the number of side stitches, and means connected with the feeding mechanism and acting after the arrest of the stitch-forming mechanism and subsequent to the barring operation for imparting a relative semi-rotation between the stitch-forming mechanism and the work-clamp to establish the initial relation of the same.

7. In a buttonhole stitching machine, the combination with overseaming stitch-forming mechanism, means for imparting a semi-rotation thereto, and feeding mechanism for producing relative feeding movements between the stitch-forming mechanism and the work, whereby an eyelet-end buttonhole with a plurality of barring stitches at its smaller end may be produced, of a stop-motion device, adjustable means for tripping said stop-motion device to arrest the stitch-forming mechanism after the barring operation has commenced, and means for imparting a semi-rotation to the stitch-forming mechanism to bring the same to initial position after the stitch-forming mechanism has been arrested.

8. In a buttonhole stitching machine, the combination with overseaming stitch-forming mechanism, turning mechanism therefor, and feeding mechanism for producing relative feeding movements between the stitch-forming mechanism and the work, whereby an eyelet-end buttonhole with a plurality of barring stitches at its smaller end may be produced, of adjustable means whereby the action of the stitch-forming mechanism may be interrupted either immediately at the end of a side stitching operation or after bar stitches have been formed.

9. In a buttonhole stitching machine, the combination with overseaming stitch-forming mechanism, means for imparting a semi-rotation thereto, and feeding mechanism for producing relative feeding movements between the stitch-forming mechanism and the work, whereby an eyelet-end buttonhole with a plurality of barring stitches at its smaller end may be produced, of adjustable means whereby the action of the stitch-forming mechanism may be interrupted either immediately at the end of a side stitching operation or after bar stitches have been formed, and means for imparting a semi-rotation to the stitch-forming mechanism to bring the same to initial position after the stitch-forming mechanism has been arrested.

10. In a buttonhole stitching machine, the combination with overseaming stitch-forming mechanism, means for rotating the stitch-forming mechanism for stitching the eye of a buttonhole, and feeding mechanism for producing relative feeding movements between the stitch-forming mechanism and the work, of barring mechanism including means for increasing the length of overseam stitches for the bar, and means whereby the length of barring stitches may be varied independently of and relatively to that of the side-stitches.

11. In a buttonhole stitching machine, the combination with stitch-forming mechanism including a needle and positively acting means for imparting jogging movements to the same throughout the entire buttonhole-stitching cycle, a work-clamp, means for sustaining the same for lateral and longitudinal movement and for permanently maintaining its parallelism with the direction of longitudinal feeding movement, means for producing relative feeding movements and sidewise shifting movements between the stitch-forming mechanism and the clamp, normally ineffective clamp-jogging mechanism including a laterally moving member with means for imparting to it operative movements throughout the buttonhole stitching cycle, and means for rendering the feeding mechanism ineffective in controlling the lateral position of the clamp and simultaneously coupling said member of the clamp-jogging mechanism with the clamp.

12. In a buttonhole stitching machine, the combination with stitch-forming mechanism including a laterally jogging needle with means for imparting thereto jogging movements throughout the entire buttonhole stitching cycle, a work-clamp, feeding mechanism including positively acting means for controlling the position of the clamp relatively to the stitch-forming mechanism during the side-stitching operation, normally ineffective clamp-jogging mechanism including a reciprocating member movable in a plane parallel with that of the lateral movement of the needle and in a direction opposite to that of the needle-jogging movements, and means for simultaneously disconnecting the clamp from a member of the feeding mechanism and coupling the same to said reciprocating member of the clamp-jogging mechanism to increase the amplitude of jogging movements between the stitch-forming mechanism and the clamp for the barring operation.

13. In a buttonhole stitching machine, the combination with stitch-forming mechanism including a laterally moving needle, uniformly acting jogging means therefor, a work-clamp, feeding mechanism therefor, and clamp-jogging means, of an operative connection between the needle-jogging and clamp-jogging means whereby they are permanently timed to move in opposite directions the parts to which they are respectively connected, and means acting independently of the needle-jogging means for coupling and uncoupling the clamp-jogging means and the clamp.

14. In a buttonhole stitching machine, the combination with stitch-forming mechanism including a laterally moving needle, jogging means therefor, a work-clamp, means for sustaining the same for lateral and longitudinal movement and for permanently maintaining its parallelism with the direction of longitudinal movement, feeding mechanism therefor, and normally ineffective clamp-jogging means including a reciprocating member movable in substantially the direction of lateral movement of the needle and adapted for imparting to the clamp movements in opposition to the lateral jogging movements of the needle, of means for simultaneously disconnecting the clamp from a member of the feeding mechanism and coupling the same with said reciprocating member of the clamp-jogging means, and an operative connection between the needle-jogging and clamp-jogging means whereby they are permanently timed to move in opposite directions the parts to which they are respectively connected.

15. In a buttonhole stitching machine, the combination with stitch-forming mechanism including a laterally jogging needle with continuously acting means for imparting thereto jogging movements throughout the entire buttonhole stitching cycle, a work-clamp, means for sustaining the same for lateral and longitudinal movement and for permanently maintaining its parallelism with the direction of longitudinal movement, feeding mechanism including positively acting means for imparting side-shifting movements to the clamp, continuously acting clamp-jogging means normally disconnected from the clamp and adapted for imparting to the latter sidewise movements parallel with and in the opposite direction from the jogging movements of the needle, and means for coupling the clamp-jogging means with the clamp.

16. In a buttonhole stitching machine, the combination with stitch-forming mechanism including a laterally jogging needle, a work-clamp including a slide-plate fitted to and movable within ways substantially parallel with the direction of lateral jogging movement of the needle, feeding mechanism including positively acting means permanently connected with said slide-plate of the clamp for imparting side-shifting movements to the same, continuously acting clamp-jogging means normally disconnected from the clamp, and means for coupling the clamp-jogging means with a member of the side-shifting means permanently connected with the clamp.

17. In a buttonhole stitching machine, the combination with stitch-forming mechanism including a laterally jogging needle, a work-clamp, and clamp-jogging mechanism including a reciprocating member, of feeding mechanism including means for imparting to the clamp longitudinal work-advancing movements to space the stitches and a side-shift lever connected with the clamp and provided with a slide bolt carrying studs one of which normally engages the actuating means of said lever during the side-stitching operation and another of which is adapted to engage said reciprocating member of the clamp jogging mechanism during the barring operation, and means for actuating said slide-bolt to couple one of said studs and uncouple the other of said studs from its respective engaging means.

18. In a buttonhole stitching machine, the combination with stitch-forming mechanism including a laterally jogging needle, a work-clamp, clamp-jogging mechanism including a vibratory lever provided with a fork, and feeding mechanism comprising a rotary cam-wheel with longitudinal feeding and side-shifting cam portions, an operative connection between the clamp and the feeding cam portion, and a side-shift lever connected at one end with the clamp and carrying at the opposite end a transverse slide-bolt having a stud engaging said side-shifting cam portion and a second stud adapted to enter the fork of the clamp-jogging lever, and controlling means for the slide-bolt for simultaneously disengaging one stud from the cam and introducing the other stud into the fork of the clamp-jogging lever.

19. In a buttonhole stitching machine, the combination with stitch-forming mechanism including a laterally jogging needle, a work-clamp, clamp-jogging mechanism including a vibratory lever provided with a fork having an open-ended stud-socket with flaring mouth to afford inwardly inclined guide-wings leading into said socket, and feeding mechanism comprising a rotary cam-wheel with longitudinal feeding and side-shifting cam portions, an operative connection between the clamp and the feeding cam portion, and a side-shift lever connected at one end with the clamp and carrying at the opposite end a transverse spring-pressed slide-bolt having a stud engaging said side-shifting cam portion and a second stud adapted to enter the fork of the clamp-jogging lever, and controlling means for the slide-bolt simultaneously disengaging one stud from the cam and introducing the other stud into the fork of the clamp-jogging lever.

20. In a buttonhole stitching machine, the combination with stitch-forming mechanism including a laterally jogging needle, a work-clamp, clamp-jogging mechanism including a vibratory lever, and feeding mechanism including an actuating member, means connected therewith for imparting to the clamp longitudinal work-advancing movements to space the stitches and a side-shift lever intermediate the actuating member and the clamp with which it is permanently connected and provided with a spring-pressed slide-bolt adapted for alternate engagement with said actuating member and the clamp-jogging lever, a latch-member carried by the side-shift lever for maintaining the slide-bolt in one of its operative positions, means for disengaging said latch from the slide-bolt, and means for returning the slide-bolt to initial operative position upon the side-shift lever.

21. In a buttonhole stitching machine, the combination with stitch-forming mechanism including a laterally jogging needle, a work-clamp, clamp-jogging mechanism including a vibratory lever, and feeding mechanism including an actuating member, means connected therewith for imparting to the clamp longitudinal work-advancing movements to space the stitches and a side-shift lever intermediate the actuating member and the clamp with which it is permanently connected and provided with a spring-pressed slide-bolt adapted for alternate engagement with said actuating member and the clamp-jogging lever, a latch-member carried by the side-shift lever for maintaining the slide-bolt in one of its operative positions, means carried by the actuating member of the feeding mechanism for disengaging said latch from the slide-bolt, and means for returning the slide-bolt to initial operative position upon the side-shift lever.

22. In a buttonhole stitching machine, the combination with stitch-forming mechanism including a laterally jogging needle, rotating means for said stitch-forming mechanism whereby a semi-rotation is imparted thereto during the stitching of the eye of an eyelet-end buttonhole and the same is thereafter returned to initial position, a work-clamp, clamp-jogging mechanism including a vibratory lever, and feeding mechanism including an actuating member, means connected therewith for imparting to the clamp longitudinal work-advancing movements to space the stitches and a side-shift lever intermediate the actuating member and the clamp with which it is permanently connected and provided with a spring-pressed slide-bolt adapted for alternate engagement with said actuating member and the clamp-jogging lever, a latch-member carried by the side-shift lever for maintaining the slide-bolt in one of its operative positions, means for disengaging said latch from the slide-bolt, and means connected with the rotating means of the stitch-forming mechanism for returning the slide-bolt to initial operative position upon the side-shift lever.

23. In a buttonhole stitching machine, the combination with stitch-forming mechanism including a laterally moving needle, a work-clamp, and mechanism for producing relative feeding movements between the stitch-forming mechanism and the clamp, of needle jogging means including a rock-shaft mounted above and longitudinally of the work-clamp with operative connections with the needle, a clamp-jogging lever adapted for connection with the clamp, a fulcrum for said lever parallel with said rock-shaft, an actuating rocking member, and operative connections whereby said rocking member is connected respectively with the needle-jogging rock-shaft and the clamp-jogging lever.

24. In a buttonhole stitching machine, the combination with stitch-forming mechanism including a laterally moving needle, a work-clamp, and mechanism for producing relative feeding movements between the stitch-forming mechanism and the clamp, of needle-jogging means including a rock-shaft with operative connections with the needle, a clamp-jogging lever normally disconnected from the clamp, coupling means for connecting said lever with the clamp, a controlling device for said coupling means, an actuating rocking member, and operative connections whereby said rocking member is connected respectively with the needle-jogging rock-shaft and the clamp-jogging lever.

25. In a buttonhole stitching machine, the combination with a frame comprising a base and an overhanging bracket-arm, a rotary shaft journaled in said bracket-arm, an actuating cam thereon, stitch-forming mechanism including a laterally moving needle, a work-clamp, and mechanism for producing relative feeding movements between the stitch-forming mechanism and the clamp, of needle-jogging means, a clamp-jogging lever adapted for connection with the clamp, a yoked vibratory arm fulcrumed upon the bracket-arm and embracing said actuating cam, and independent means for operatively connecting said arm respectively with needle-jogging means and the clamp-jogging lever.

26. In a buttonhole stitching machine, the combination with stitch-forming mechanism including a laterally jogging needle, rotating means for said stitch-forming mechanism whereby a semi-rotation is imparted thereto during the stitching of the eye of an eyelet-end buttonhole and the same is thereafter returned to initial position, a work-clamp, clamp-jogging mechanism including a vibratory lever, and feeding mechanism including a rotary feed-wheel, means connected therewith for imparting to the clamp longitudinal work-advancing movements to space the stitches and a side-shift lever intermediate the feed-wheel and the clamp with which it is permanently connected and provided with a spring-pressed slide-bolt for alternate engagement with the feed-wheel and the clamp-jogging lever, of a latch-member carried by the side-shift lever for maintaining the slide-bolt in one of its operative position, a tripping stud upon the feed-wheel for disengaging said latch from the slide-bolt, and means connected with the rotating means of the stitch-forming mechanism for returning the slide-bolt to initial operative position upon the side-shift lever.

27. In a buttonhole stitching machine, the combination with stitch-forming mechanism including a laterally jogging needle, rotating means for said stitch-forming mechanism whereby a semi-rotation is imparted thereto during the stitching of an eye of an eyelet-end buttonhole and the same is thereafter returned to initial position, a work-clamp, clamp-jogging mechanism including a vibratory lever, and feeding mechanism including an actuating member, means connected therewith for imparting to the clamp longitudinal work-advancing movements to space the stitches and a side-shift lever intermediate the actuating member and the clamp with which it is permanently connected and provided with a spring-pressed slide-bolt adapted for alternate engagement with said actuating member and the clamp-jogging lever, of a latch-member carried by the side-shift lever for maintaining the slide-bolt in one of its operative positions, means for disengaging said latch from the slide-bolt, a pin carried by the rotating means for the stitch-forming mechanism, and a rock-lever having a cam portion in operative relation with said pin and adapted for engagement with the slide-bolt to move the latter in opposition to its spring in returning it to initial position upon the side-shift lever.

28. In a buttonhole stitching machine, the combination with stitch-forming mechanism including a laterally jogging needle, a work-clamp, and feeding mechanism for producing relative feeding movements between the stitch-forming mechanism and the clamp, of clamp-jogging mechanism, automatically acting coupling means between the clamp and its jogging means whereby they may be coupled and uncoupled respectively for the barring and side-stitching of a buttonhole, and means connected therewith for adjusting the range of movement imparted by said jogging mechanism relatively to the range of needle jogging movement independently of the amplitude of clamp jogging movement.

29. In a buttonhole stitching machine, the combination with stitch-forming mechanism including a uniformly actuated laterally jogging needle, a work-clamp, and feeding mechanism for producing relative feeding movements between the stitch-forming mechanism and the clamp, of clamp-jogging mechanism, automatically acting coupling means between the clamp and its jogging means whereby they may be coupled and uncoupled respectively for the barring and side-stitching of a buttonhole, and means connected with said jogging means for independently adjusting both the range and the amplitude of movement of said jogging mechanism.

30. In a buttonhole stitching machine, the combination with stitch-forming mechanism including a laterally jogging needle, a work-clamp, and feeding mechanism for producing relative feeding movements between the stitch-forming mechanism and the clamp, of clamp-jogging mechanism including a vibratory lever, means for establishing and interrupting operative relation between said lever and the work-clamp, a reciprocatory actuating member for said lever, and a connection between said reciprocatory member and said lever including a pivotal pin having an eccentric shank and means for securing said pin in its position of circular adjustment relative to the parts which it connects.

31. In a buttonhole stitching machine, the combination with stitch-forming mechanism including a laterally jogging needle, a work-clamp, and feeding mechanism for producing relative feeding movements between the stitch-forming mechanism and the clamp, of clamp-jogging mechanism including a vibratory lever, a fulcrum upon which the same is mounted, means for establishing and interrupting operative relation between said lever and the work-clamp, a reciprocatory actuating member for said lever, and a connection between said reciprocatory member and said lever and movable toward and from the fulcrum of the latter for adjusting the amplitude of movement of said lever.

32. In a buttonhole stitching machine, the combination with overseam stitch-forming mechanism, a work-clamp, turning means for imparting a semi-rotation to the stitch-forming mechanism, and mechanism, including a rotary feed-wheel and actuating means therefor, for producing relative feeding and side-shifting movements between the stitch-forming mechanism and the work-clamp, and for actuating said turning means, a buttonhole cutting device and actuating means therefor independent of said feed-wheel, of means for starting simultaneously the operative movement of the feed-wheel and the action of the stitch-forming mechanism, means for arresting the action of the stitch-forming mechanism and of the said feed-wheel actuating means before the feed-wheel has finished a complete rotation, and means for continuing the movement of the feed-wheel in the same direction to return it to initial position.

33. In a buttonhole stitching machine, the combination with overseaming stitch-forming mechanism, a work-clamp, mechanism, including a rotary feed-wheel, for producing relative feeding and side-shifting movements between the stitch-forming mechanism and the clamp, turning mechanism operatively connected with the feed-wheel for imparting a semi-rotation to the stitch-forming mechanism, and feed-wheel actuating means, of means for simultaneously arresting the action of the stitch-forming mechanism and the feed-wheel actuating means after the first turning movement of the stitch-forming mechanism and before the feed-wheel has finished a complete rotation, and means operative immediately thereafter for continuing the movement of the feed-wheel in the same direction to initial position and thereby effecting a final reverse turning movement of the stitch-forming mechanism and the return of the work-clamp to initial operative relation with the stitch-forming mechanism.

34. In a buttonhole stitching machine, the combination with overseaming stitch-forming mechanism, a work-clamp disposed in initial operative relation with the stitch-forming mechanism, means for sustaining the same for lateral and longitudinal movement and for permanently maintaining its parallelism with the direction of longitudinal movement, mechanism including a rotary feed-wheel for producing relative feeding and side-shifting movements between the stitch-forming mechanism and the clamp, turning mechanism for imparting to the stitch-forming mechanism semi-rotations in opposite directions respectively during and subsequent to the stitching of a buttonhole, and an operative connection between said turning mechanism and the feed-wheel, of means for turning the feed-wheel through a partial rotation during the stitching operation, and independent actuating means acting subsequently to the stitching operation to complete the rotation of the feed-wheel and return the same to initial position.

35. In a buttonhole stitching machine, the combination with overseaming stitch-forming mechanism, a work-clamp disposed in initial operative relation with the stitch-forming mechanism, mechanism including a rotary feed-wheel for producing relative feeding and side-shifting movements between the stitch-forming mechanism and the clamp, turning mechanism for imparting to the stitch-forming mechanism semi-rotations in opposite directions respectively during and subsequent to the stitching of a buttonhole, and an operative connection between said turning mechanism and the feed-wheel, of means for turning the feed-wheel through a partial rotation during the stitching operation, a stop-motion device for arresting the action of the stitch-forming mechanism at the completion of a buttonhole stitching operation, independent actuating means for completing the rotation of the feed-wheel to return the same to initial position, and means controlled by the stop-motion device for throwing said independent actuating means into operative relation with the feed-wheel.

36. In a buttonhole stitching machine, the combination with overseaming stitch-forming mechanism and actuating means therefor, a work-clamp, and mechanism for producing relative feeding and side-shifting movements between the stitch-forming mechanism and the clamp and comprising a rotary feed-wheel and actuating means therefor including a clutch in permanent operative relation with the feed-wheel and connected with the actuating means of the stitch-forming mechanism, of a stop-motion device for arresting the action of the stitch-forming mechanism and said feed-wheel actuating mechanism after the feed-wheel has accomplished a partial rotation, independent actuating means including a continuously acting ratchet-and-pawl mechanism for turning the feed-wheel through the remainder of a rotation, and a connection between the pawl of said independent feed-wheel actuating means and the stop-motion device for throwing said independent actuating means into action after the arresting of the stitch-forming mechanism.

37. In a buttonhole stitching machine, the combination with overseaming stitch-forming mechanism and actuating means therefor, a work-clamp, mechanism for producing relative feeding and side-shifting movements between the stitch-forming mechanism and the clamp and comprising a rotary feed-wheel and actuating means therefor including a clutch in permanent operative relation with the feed-wheel and connected with the actuating means of the stitch-forming mechanism, and turning mechanism actuated by a connection with said feed-wheel for imparting relative turning movements between the stitch-forming mechanism and the clamp in opposite directions respectively during and subsequent to the stitching of a buttonhole, of a stop-motion device for arresting the action of the stitch-forming mechanism and said feed-wheel actuating mechanism after the feed-wheel has accomplished a partial rotation, means independent of said feed-wheel actuating means for turning the feed-wheel through the remainder of a rotation to produce the final relative turning movement between the stitch-forming mechanism and the clamp, and a connection between said independent feed-wheel actuating means and the stop-motion device for throwing the same into action after the arresting of the stitch-forming mechanism.

38. In a buttonhole stitching machine, the combination with overseaming stitch-forming mechanism including a laterally jogging needle, a work-clamp, clamp-jogging mechanism, normally inoperative coupling means for connecting the clamp with its jogging means for a barring operation, mechanism for producing relative feeding and side-shifting movements between the stitch-forming mechanism and the clamp, turning mechanism for imparting to the stitch-forming mechanism semi-rotations respectively during and subsequent to the stitching of a buttonhole, and means for actuating said turning mechanism to impart its initial turning movement, of means for arresting the action of the stitch-forming mechanism while the work-clamp is connected with its jogging mechanism, and independently operated means acting through a member of the feeding mechanism for imparting to the turning mechanism its final turning movement and for uncoupling from the said jogging mechanism the clamp and returning the latter to initial position.

39. In a buttonhole stitching machine, the combination with overseaming stitch-forming mechanism, a work-clamp, mechanism for imparting turning movements to the stitch-forming mechanism, and mechanism for producing relative feeding movements between the stitch-forming mechanism and the clamp, whereby an eyelet-end buttonhole with barring stitches at its smaller end may be produced, of adjusting means whereby the number of side stitches may be varied, and adjusting means for varying the number of barring stitches irrespective of the number of side-stitches.

40. In a buttonhole stitching machine, the combination with overseaming stitch-forming mechanism, a work-clamp, mechanism for producing relative turning movements between the stitch-forming mechanism and the clamp, and mechanism for producing relative feeding movements between the stitch-forming mechanism and the clamp, whereby an eyelet-end buttonhole with barring stitches at its smaller end may be produced, of means for varying the number and spacing of the side stitches with a given number of barring stitches.

41. In a buttonhole stitching machine, the combination with stitch-forming mechanism including a laterally jogging needle, means for rotating the same, a work-clamp, and mechanism for producing relative feeding movements and side-shifting movements between the stitch-forming mechanism and the clamp, of clamp-jogging mechanism, and controlling means therefor whereby the clamp may be jogged in the opposite direction from the lateral movements of the needle.

42. In a buttonhole stitching machine, the combination with overseaming stitch-forming mechanism, a work-clamp including clamping members movable to and from each other, means for rotating the stitch-forming mechanism, and mechanism for producing relative feeding movements between the stitch-forming mechanism and the clamp, of a buttonhole cutting device, actuating means for imparting to the same successively lateral traveling movements relatively to the stitch-forming mechanism and cutting movements transversely thereof, means actuated by a member of the cutting device in its initial traveling movement for closing the clamp upon the work, and means connected with a moving part of the machine for opening the clamp after the completion of a buttonhole stitching operation.

43. In a buttonhole stitching machine, the combination with overseaming stitch-forming mechanism, a work-clamp including clamping members movable to and from each other, means for rotating the stitch-forming mechanism, and mechanism for producing relative feeding movements between the stitch-forming mechanism and the clamp, of a buttonhole cutting device, actuating means therefor, means actuated by the cutting device for closing the clamp upon the work, and means connected with the means for rotating the stitch-forming mechanism whereby the clamp is automatically opened after the completion of a buttonhole stitching operation.

44. In a buttonhole stitching machine, the combination with overseaming stitch-forming mechanism, actuating means therefor, a work-clamp including clamping members movable to and from each other, turning mechanism for imparting to the stitch-forming mechanism semi-rotations in opposite directions respectively during and subsequent to the stitching of a buttonhole, and a stop-motion device for arresting the action of the stitch-forming mechanism, of a buttonhole cutting device, actuating means therefor, means actuated by the cutting device for closing the clamp upon the work, means acting subsequently to the arresting of the stitch-forming mechanism whereby a final semi-rotation is given to the same to return it to initial position, and means connected with said turning mechanism whereby the clamp is automatically opened after the completion of a buttonhole stitching operation.

45. In a buttonhole stitching machine, the combination with overseaming stitch-forming mechanism, actuating means therefor, a work-clamp including clamping members movable to and from each other, turning mechanism for imparting to the stitch-forming mechanism semi-rotations in opposite directions respectively during and subsequent to the stitching of a buttonhole, and a stop-motion device for arresting the action of the stitch-forming mechanism, of a buttonhole cutting device, actuating means therefor independent of the actuating means of the stitch-forming mechanism, means actuated by the cutting device for closing the clamp upon the work, means acting subsequently to the arresting of the stitch-forming mechanism whereby a final semi-rotation is given to the same to return it to initial position, and means connected with said turning mechanism whereby the clamp is automatically opened after the completion of a buttonhole stitching operation.

46. In a buttonhole stitching machine, the combination with overseaming stitch-forming mechanism, a work-clamp including clamping members movable to and from each other, clamp closing means including a rock-shaft having operative connections with the movable clamp-member and a crank-arm, and mechanism for producing relative feeding movements between the stitch-forming mechanism and the clamp, of a traveling buttonhole cutting device movable toward and from cutting position and including a cutting member movable transversely to its direction of travel and adapted in its movement toward cutting position transversely to the operative movement of its cutting member to engage the crank-arm of the clamp closing rock-shaft, and means for bodily advancing and retracting the cutting device to and from cutting position and for actuating its cutting member.

47. In a buttonhole stitching machine, the combination with overseaming stitch-forming mechanism, a work-clamp including clamping members movable to and from each other, clamp-closing means including a rock-shaft having operative connections with the movable clamp member and a laterally extending finger, turning mechanism including a reciprocatory bar for imparting to the stitch-forming mechanism semi-rotations in opposite directions respectively during and subsequent to the stitching of a buttonhole, mechanism for producing relative feeding movements between the stitch-forming mechanism and the clamp, and a cutting device adapted for operative engagement with the clamp-closing means whereby the clamp may be closed upon the work, of a projection carried by said reciprocatory bar and adapted to engage the finger of the clamp-closing rock-shaft whereby the clamp may be automatically opened after a stitching operation.

48. In a buttonhole stitching machine, the combination with overseaming stitch-forming mechanism, a work-clamp including clamping members movable to and from each other, clamp-closing means including a rock-shaft having operative connections with the movable clamp member and a laterally extending finger, turning mechanism including a reciprocatory bar for imparting to the stitch-forming mechanism semi-rotations in opposite directions respectively during and subsequent to the stitching of a buttonhole, mechanism for producing relative feeding movements between the stitch-forming mechanism and the clamp, and a cutting device adapted for operative engagement with the clamp-closing means whereby the clamp may be closed upon the work, of a tappet-arm carried by and movable with said reciprocatory bar and provided with a spring-pressed latch-block adapted for contact with the finger of the clamp-operating rock-shaft in both its directions of movement, said latch-block being thrust aside by said finger in the initial turning movement and acting to shift said finger to open the clamp in the final turning movement between the stitch-forming mechanism and the clamp.

49. In a buttonhole stitching machine, the combination with overseaming stitch-forming mechanism, a work-clamp including clamping members movable to and from each other, clamp-closing means including a rock-shaft having operative connections with the movable clamp member and a crank-arm and an oppositely extending finger, turning mechanism including a reciprocatory bar for imparting to the stitch-forming mechanism semi-rotations in opposite directions respectively during and subsequent to the stitching of a buttonhole, mechanism for producing relative feeding movements between the stitch-forming mechanism and the clamp, a traveling buttonhole cutting device adapted to engage the crank-arm of the clamp-closing rock-shaft, and means for bodily advancing and retracting the cutting device to and from cutting position and for actuating its cutting member, of a projection carried by said reciprocatory bar and adapted to engage the finger of the clamp-closing rock-shaft whereby the clamp may be automatically opened after a stitching operation.

50. In a buttonhole stitching machine, the combination with overseaming stitch-forming mechanism, a work-clamp including clamping members formed with laterally separable parts, mechanism for producing relative feeding movements between the stitch-forming mechanism and the clamp, a traveling buttonhole cutting device, and means for bodily advancing and retracting the cutting device to and from cutting position and for actuating its cutting member, of clamp-spreading means adapted for operative connection with said cutting device whereby the clamp is spread during the retraction of the same.

51. In a buttonhole stitching machine, the combination with overseaming stitch-forming mechanism, a work-clamp including clamping members formed with laterally separable parts, mechanism for producing relative feeding movements between the stitch-forming mechanism and the clamp, a traveling buttonhole cutting device, and actuating means for bodily advancing and retracting the cutting device to and from cutting position and for actuating its cutting member, of clamp spreading means, means carried thereby for operative engagement with the cutter-actuating means whereby the clamping members may be drawn together, and a member carried by the clamp-spreading means and adapted for engagement with the traveling cutter whereby the clamp may be spread after a cutting operation.

52. In a buttonhole stitching machine, the combination with overseaming stitch-forming mechanism, a traveling work-clamp including clamping members formed with laterally separable parts, mechanism for imparting feeding movements to the work-clamp, a traveling buttonhole cutting device, and actuating means for bodily advancing and retracting the cutting device to and from cutting position and for actuating its cutting member, of a clamp-spreader traveling with the clamp, a shifting member carried thereby and successively engaged by the cutter-actuating means and the cutting device for moving the separable clamping members toward and from each other, and means for maintaining said shifting member out of operative relation with the cutting device during the feeding movements of the clamp.

53. In a buttonhole stitching machine, the combination with overseaming stitch-forming mechanism, a traveling work-clamp including clamping members formed with laterally separable parts, mechanism for imparting feeding movements to the work-clamp, a traveling buttonhole cutting device, and actuating means for bodily advancing and retracting the cutting device to and from cutting position and for actuating its cutting member, of a clamp-spreader traveling with the clamp, a shifting lever fulcrumed upon the clamp-spreader and having an arm adapted for initial engagement with the cutter actuating means for actuating the spreader in one direction and a second arm adapted for engagement with the cutting device whereby the spreader is actuated in the opposite direction, and means for maintaining the shifting lever out of operative relation with the cutting device during the travel of the work-clamp in the stitching of the buttonhole.

54. In a buttonhole stitching machine, the combination with overseaming stitch-forming mechanism, a traveling work-clamp including clamping members formed with laterally separable parts, mechanism for imparting feeding movements to the work-clamp, a traveling buttonhole cutting device, actuating means, including rotary cam-wheels normally stationary during the stitching operation, for bodily moving the cutting device to and from cutting position and for actuating its cutting member, of a clamp-spreader traveling with the clamp, a plural-armed shifting lever fulcrumed upon the clamp-spreader with one arm adapted for operative engagement with the traveling cutting device for moving the spreader in one direction, a cam-piece upon the cutter-actuating cam adapted to engage another arm of said lever for moving the spreader in the opposite direction, a second cam-piece upon the cutter-actuating cam for engagement with the second-named arm of said lever to shift its first-named arm out of operative relation with the cutting device, and a spring for maintaining said lever in operative relation with the actuating cam-wheel.

55. In a buttonhole stitching machine, the combination with overseaming stitch-forming mechanism, a traveling work-clamp including clamping members formed with laterally separable parts, mechanism for imparting feeding movements to the work-clamp, a traveling buttonhole cutting device, and actuating means for bodily advancing and retracting the cutting device to and from cutting position and for actuating its cutting member, of a clamp-spreader traveling with the clamp, a shifting lever fulcrumed upon the clamp-spreader and having an arm carrying a contact-screw adjustable in the line of travel of and adapted to operatively engage the cutting device for moving the spreader in one direction and having a second arm adapted for engagement with the cutter actuating means for actuating the spreader in the opposite direction, and means for maintaining the shifting lever out of operative relation with the cutting device during the travel of the work-clamp in the stitching of the buttonhole.

56. In a buttonhole stitching machine, the combination with overseaming stitch-forming mechanism, a work-clamp including clamping members formed with laterally separable parts, mechanism for producing relative feeding movements between the stitch-forming mechanism and the clamp, a buttonhole cutting device, and actuating means whereby relative traveling movements are produced between the clamp and the cutting device for the buttonhole cutting operation, of a clamp-spreader, means actuated by said cutting device for operating the same and adjusting means whereby the degree of separation of the clamping members may be varied.

57. In a buttonhole stitching machine, the combination with overseaming stitch-forming mechanism, a work-clamp including clamping members formed with laterally separable parts, mechanism for producing relative feeding movements between the stitch-forming mechanism and the clamp, a buttonhole cutting device, and actuating means whereby relative traveling movements are produced between the clamp and the cutting device for the buttonhole cutting operation, of a clamp-spreader, and means carried by the spreader and adjustable in the direction of relative travel between the clamp and the cutting device for engagement with the latter and from which the spreader derives its spreading movements.

58. In a buttonhole stitching machine, the combination with overseaming stitch-forming mechanism, of a longitudinally movable feed slide-plate formed with parallel transverse ways, a cross slide-plate fitted for lateral movement in said ways of the feed slide-plate and formed with parallel longitudinal slideways and overlying transverse guideways; a spreader-frame formed with parallel members fitted to said slideways and provided with convergently inclined guide-ribs, clamp-arm bearing plates formed in their under sides with grooves fitted to the said convergent guide-ribs and having their edges fitted to the transverse guide-ways of the cross slide-plate, lower clamping members secured to said bearing plates, clamp-arms provided with work-engaging feet and pivotally mounted upon said bearing plates, means for imparting longitudinal feeding movements to the feed slide-plate and side-shifting movements to the cross slide-plate, and means for imparting to said spreader-frame longitudinal movements independently of those of the cross slide-plate, whereby the upper and lower work-clamping members are moved laterally toward and from each other.

59. In a buttonhole stitching machine, the combination with overseaming stitch-forming mechanism, of a longitudinally movable feed slide-plate formed with parallel transverse ways, a cross slide-plate fitted for lateral movement in said ways of the feed slide-plate and formed with parallel longitudinal slideways and overlying transverse guideways, a spreader-frame formed with parallel members fitted to said slideways and provided with convergently inclined guide-ribs, clamp-arm bearing plates formed in their under sides with grooves fitted to the said convergent guide-ribs and having their edges fitted to the transverse guideways of the cross slide-plate, lower clamping members secured to said bearing plates, clamp-arms provided with work-engaging feet and pivotally mounted upon said bearing plates, means for imparting longitudinal feeding movements to the feed slide-plate and side-shifting movements to the cross slide-plate, a buttonhole cutting device, actuating means for bodily advancing and retracting the cutting device to and from cutting position independently of the feeding movements imparted to the work-clamp for actuating its cutting member, and means for establishing operative connection between the cutting device and the spreader-frame whereby the latter receives operative movements to spread the laterally separable members of the work-clamp.

60. In a buttonhole stitching machine, the combination with upper stitch-forming mechanism including a reciprocating needle, lower stitch-forming mechanism, a rotary support for the latter turning means for said stitch-forming mechanism, and means for producing relative feeding movements between the stitch-forming mechanism and the work, of a traveling buttonhole cutting device provided with an operative member movable across the path of reciprocation of said needle, actuating means for imparting to the cutting device bodily advancing and receding movements to and from cutting position and for imparting operative movements to its cutting member, a needle-throat, a tilting carrier therefor pivotally mounted upon said rotary support, a slide-pin movable transversely of the tilting movements of said carrier and provided with spaced thrust-collars, a locking member fixed upon said slide-pin and provided with divergent locking arms normally embracing a member of said carrier, a spring connected with said slide-pin to maintain said locking device in engagement with the carrier, and a bracket member carried by the traveling cutting device and provided with a laterally forked lug embracing said pin intermediate its thrust-collars and adapted to alternately engage the same in the extreme positions of the cutter.

61. In a buttonhole stitching machine, the combination with overseaming stitch-forming mechanism, work-clamp, a circularly moving cam, means connected with said cam and acting in the edge-stitching operation to produce between the stitch-forming mechanism and the work-clamp longitudinal feeding and side-shift movements and to impart to the stitch-forming mechanism rotary movements in the production of an eyed buttonhole, and means for interrupting the initial edge-stitching relation of the stitch-forming mechanism and the work-clamp and establishing barring relation of said parts whereby cross-barring stitches are produced at the end of the buttonhole, of bar-controlling means including an adjustable member adapted for varying the number of barring stitches independently of the edge-stitches, and means for restoring the parts to initial edge-stitching relation.

62. In a buttonhole stitching machine, the combination with overseaming stitch-forming mechanism, a work-clamp, a circularly moving cam, means connected with said cam and acting in the edge-stitching operation to produce between the stitch-forming mechanism and the work-clamp longitudinal feeding and side-shift movements and to impart to the stitch-forming mechanism rotary movements in the production of an eyed buttonhole, and means for interrupting the initial edge-stitching relation of the stitch-forming mechanism and the work-clamp and establishing barring relation of said parts whereby cross-barring stitches are produced at the end of the buttonhole, of bar-controlling means including an adjustable member adapted for varying the number of barring stitches independently of the edge-stitches, and means acting subsequently to the action of the bar-controlling means for restoring the parts to initial edge-stitching relation.

63. In a buttonhole stitching machine, the combination with overseaming stitch-forming mechanism, a work-clamp, a circularly moving cam, means connected with said cam and acting in the edge-stitching operation to produce between the stitch-forming mechanism and the work-clamp longitudinal feeding and side-shift movements and to impart to the stitch-forming mechanism rotary movements in the production of an eyed buttonhole, and means for interrupting the initial edge-stitching relation of the stitch-forming mechanism and the work-clamp and establishing barring relation of said parts whereby cross-barring stitches are produced at the end of the buttonhole, of bar-controlling means including a member independent of the connections between said cam and the work-clamp and adapted for adjustment to vary the number of barring stitches independently of that of the edge-stitches, and means for restoring the parts to initial edge-stitching relation.

64. In a buttonhole stitching machine, the combination with overseaming stitch-forming mechanism, a work-clamp, a circularly moving cam, means connected with said cam and acting in the edge-stitching operation to produce between the stitch-forming mechanism and the work-clamp longitudinal feeding and side-shift movements and to impart to the stitch-forming mechanism rotary movements in the production of an eyed buttonhole, and means for interrupting the initial edge-stitching relation of the stitch-forming mechanism and the work-clamp and establishing barring relation of said parts whereby cross-barring stitches are produced at the end of the buttonhole, of bar-controlling means including an adjustable member adapted for varying the number of barring stitches independently of the edge-stitches, and means actuated by said cam for restoring the parts to initial edge-stitching relation.

65. In a buttonhole stitching machine, the combination with stitch-forming mechanism including a laterally movable needle, jogging means therefor including a reciprocating member having a positive and permanent connection with the needle from which the latter receives uniform jogging movements, a work-clamp, means for sustaining the same for lateral and longitudinal movement and for permanently maintaining its parallelism with the direction of longitudinal movement, mechanism for producing between the stitch-forming mechanism and the clamp relative longitudinal feeding movements transversely to the lateral jogging movements of the needle and sidewise shifting movements, uniformly acting clamp-jogging mechanism adapted to impart to the clamp lateral movements transversely to its longitudinal feeding movements, and means for rendering the feeding mechanism ineffective in controlling the lateral position of the clamp and simultaneously coupling the clamp-jogging mechanism with the clamp.

66. In a buttonhole stitching machine, the combination with stitch-forming mechanism including a laterally moving needle, jogging means therefor, a work-clamp, feeding mechanism therefor, and clamp-jogging means including a member reciprocating in substantially the direction of lateral movement of the needle, of an operative connection between the needle-jogging and clamp-jogging means whereby they are permanently timed to move in opposite directions the parts to which they are respectively connected, and means for coupling and uncoupling said reciprocating member of the clamp-jogging means and the clamp.

67. In a buttonhole stitching machine, the combination with overseaming stitch-forming mechanism, turning mechanism therefor, a work-clamp having initial position in operative relation with the stitch-forming mechanism, feeding mechanism for producing relative feeding movements between the stitch-forming mechanism and the work-clamp, means for establishing barring relation between the stitch-forming mechanism and the work-clamp, a traveling cutting device movable toward and from the stitch-forming mechanism, and cutter-actuating mechanism, of controlling means including an adjustable operative member whereby the duration of the barring relation may be varied and the number of bar-stitches correspondingly changed independently of the number of side-stitches produced.

68. In a buttonhole stitching machine, the combination with overseaming stitch-forming mechanism, turning mechanism therefor, a work-clamp, means for sustaining said clamp for lateral and longitudinal movement and for permanently maintaining its parallelism with the direction of longitudinal movement, feeding mechanism for producing relative longitudinal feeding and lateral side-shifting movements between the stitch-forming mechanism and the work-clamp, and means for establishing barring relation between the stitch-forming mechanism and the work-clamp, of controlling means including an adjustable operative member whereby the duration of the barring relation may be varied and the number of bar-stitches correspondingly changed independently of the number of side-stitches produced, and means acting independently of the feeding mechanism and after the completion of the barring stitches for restoring the work-clamp and stitch-forming mechanism to initial position.

69. In a buttonhole stitching machine, the combination with overseaming stitch-forming mechanism, a work-clamp, mechanism including a rotary feed-wheel and actuating means therefor for producing relative longitudinal feeding and side-shifting movements between the stitch-forming mechanism and the clamp, turning mechanism operatively connected with said feed-wheel for imparting to the stitch-forming mechanism semi-rotations respectively during and subsequent to the stitching of a buttonhole, a traveling buttonhole cutting device, actuating means therefor, means connected with the cutter-actuating means for simultaneously initiating the operation of the stitch-forming mechanism and operative movement of the feed-wheel following the actuation of the cutting device, means for simultaneously arresting the operation of the stitch-forming mechanism and the feed-wheel actuating means, and means for thereafter restoring the feed-wheel to initial position.

70. In a buttonhole stitching machine, the combination with the frame comprising a base and an overhanging bracket-arm, of parallel upper and lower rotary shafts journaled respectively in the base and the bracket-arm, operative connections between said shafts by which they are rotated in unison, overseaming stitch-forming mechanism comprising a reciprocating and laterally moving eye-pointed needle and a complemental loop-taking device, an operative connection between the needle and the upper shaft and comprising a speed-accelerating device for imparting two reciprocations to the needle for each rotation of said shaft, means connected with the lower shaft for actuating the loop-taking device, and a stop-motion device for controlling the operation of the moving parts of the machine.

71. In a buttonhole stitching machine, the combination with the frame comprising a base and an overhanging bracket-arm, of parallel upper and lower rotary shafts journaled respectively in the base and the bracket-arm, operative connections between said shafts by which they are rotated in unison, overseaming stitch-forming mechanism comprising a reciprocating and laterally moving eye-pointed needle and a complemental loop-taking device, an operative connection between the needle and the upper shaft and comprising a speed-accelerating device for imparting two reciprocations to the needle for each rotation of said shaft, means connected with the lower shaft for actuating the loop-taking device, a work-clamp, mechanism connected therewith for imparting to the same a feeding movement for each reciprocation of the needle during the side stitching operation of a buttonhole, a buttonhole cutting device, actuating means therefor including a cutter-shaft driven independently of said upper and lower shafts, and a stop-motion device for controlling the operation of said upper and lower shafts.

In testimony whereof, I have signed my name to this specification, in the presence of two subscribing witnesses.

EDWARD B. ALLEN.

Witnesses:
F. S. WILLARD,
ALEX. BOYD.

---

Copies of this patent may be obtained for five cents each, by addressing the "Commissioner of Patents, Washington, D. C."